(12) United States Patent
Pudney et al.

(10) Patent No.: US 8,706,148 B2
(45) Date of Patent: Apr. 22, 2014

(54) MESSAGING IN MOBILE TELECOMMUNICATIONS NETWORKS

(75) Inventors: Christopher David Pudney, Newbury (GB); Nick Russell, Newbury (GB); Gavin Wong, Newbury (GB)

(73) Assignee: Vodafone Group PLC, Newbury, Berkshire (GB)

(*) Notice: Subject to any disclaimer, the term of this patent is extended or adjusted under 35 U.S.C. 154(b) by 260 days.

(21) Appl. No.: 12/804,641

(22) Filed: Jul. 26, 2010

(65) Prior Publication Data

US 2011/0021216 A1 Jan. 27, 2011

(30) Foreign Application Priority Data

Jul. 24, 2009 (GB) .................................. 0912944.6

(51) Int. Cl.
*H04W 4/00* (2009.01)

(52) U.S. Cl.
USPC ..................... 455/466; 455/560; 455/552.1

(58) Field of Classification Search
USPC ............... 455/552.1, 560, 561, 466
See application file for complete search history.

(56) References Cited

U.S. PATENT DOCUMENTS

| 8,175,236 B2 * | 5/2012 | Pandey et al. ............... 379/114.2 |
| 2009/0047951 A1 * | 2/2009 | Yeoum et al. ............... 455/435.1 |

FOREIGN PATENT DOCUMENTS

WO   WO2009/056932 A2   5/2009

OTHER PUBLICATIONS

ETSI TS 123 272 V8.4.0 Jun. 2009.*

3GPP TS 05.08 V8.23.0 (Nov. 2005), 3rd Generation Partnership Project; Technical Specification Group GSM/EDGE Radio Access Network; Radio subsystem link control (Release 1999), pp. 1-40.
3GPP TS 23.040 V6.8.1 (Oct. 2006), 3rd Generation Partnership Project; Technical Specification Group Core Network and Terminals; Technical realization of the Short Message Service (SMS) (Release 6), pp. 1-40.
3GPP TS 23.060 V8.5.1 (Jun. 2009), 3rd Generation Partnership Project; Technical Specification Group Services and System Aspects; General Packet Radio Service (GPRS); Service description; State 2 (Release 8), pp. 1-40.
3GPP TS 23.204 V7.5.0 (Mar. 2008), 3rd Generation Partnership Project; Technical Specification Group Services and System Aspects; Support of Short Message Service (SMS) over generic 3GPP Internet Protocol (IP) access; Stage 2 (Release 7), 20 pp.
3GPP TS 23.221 V.8.3.0 (Dec. 2008), 3rd Generation Partnership Project; Technical Specification Group Services and System Aspects; Architectural requirements (Release 8), 40 pp.

(Continued)

*Primary Examiner* — Vladimir Magloire
(74) *Attorney, Agent, or Firm* — Muirhead and Saturnelli, LLC

(57) ABSTRACT

A method of routing legacy messages between a message center and a mobile telecommunications device registered with a mobile telecommunications network, which mobile telecommunications network includes a plurality of base stations each serving a plurality of mobile telecommunications devices, and a plurality of mobility management entities, each serving a plurality of said base stations, the mobility management entities (being adapted to communicate using a legacy protocol with a legacy network for routing the legacy messages between the message center and the mobile telecommunications device via the legacy network. A legacy message interworking function communicates with the mobility management entities using the legacy protocol and directly routes messages between the mobility management entities and the message center without routing the messages via the legacy network.

20 Claims, 8 Drawing Sheets

(56) References Cited

OTHER PUBLICATIONS

3GPP TS 23.236 V5.4.0 (Sep. 2005), 3$^{rd}$ Generation Partnership Project; Technical Specification Group Services and System Aspects; Intra-domain connection of Radio Access Network (RAN) nodes to multiple Core Network (CN) nodes (Release 5), 36 pp.

3GPP TS 23.272 V8.1.0 (Sep. 2008), 3$^{rd}$ Generation Partnership Project; Technical Specification Group Services and System Aspects; Circuit Switched Fallback in Evolved Packet System; Stage 2 (Release 8), 46 pp.

3GPP TS 23.401 V8.0.0 (Dec. 2007), 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8), pp. 1-40.

3GPP TS 24.011 )V3.6.0 (Mar. 2001), 3$^{rd}$ Generation Partnership Project; Technical Specification Group Core Network; Point-to-Point (PP) Shore Message Service (SMS) support on mobile radio interface (Release 1999), pp. 1-40.

3GPP TS 24.301 V8.1.0 (Mar. 2009), 3$^{rd}$ Generation Partnership Project; Technical Specification Group Core Network and Terminals; Non-Access-Stratum (NAS) protocol for Evolved Packet System (EPS); Stage 3 (Release 8), pp. 1-40.

3GPP TS 25.304 V3.14.0 (Mar. 2004), 3$^{rd}$ Generation Partnership Project; Technical Specification Group Radio Access Network; User Equipment (UE) procedures in idle mode and procedures for cell reselection in connected mode (Release 1999), 41 pp.

3GPP TS 25.331 V5.24.0 (Jun. 2009), 3$^{rd}$ Generation Partnership Project; Technical Specification Group Radio Access Network; Radio Resource Control (RRC); Protocol Specification (Release 5), pp. 1-40.

3GPP TS 25.413 V3.14.0 (Sep. 2003), 3$^{rd}$ Generation Partnership Project; Technical Specification Group Radio Access Network; UTRAN Iu interface RANAP signalling (Release 1999), pp. 1-40).

3GPP TS 29.002 V3.20.0 (Jun. 2004), 3$^{rd}$ Generation Partnership Project; Technical Specification Group Core Network; Mobile Application Part (MAP) specification (Release 1999), pp. 1-40).

3GPP TS 29.016 V3.1.0 (Sep. 2000), 3$^{rd}$ Generation Partnership Project; Technical Specification Group Core Network; General Packet Radio Service (GPRS); Service GPRS Support Node (SGSN)—Visitors Location Register (VLR); Gs interface network service specification (3G TS 29.016 version 3.1.0), 21 pp.

3GPP TS 29.118 V8.1.0 (Mar. 2009), 3$^{rd}$ Generation Partnership Project; Technical Specification Group Core Network and Terminals; Mobility Management Entity (MME)—Visitor Location Register (VLR) SGs interface specification (Release 8), 50 pp.

3GPP TS 32.250 V8.0.0 (Dec. 2008), 3$^{rd}$ Generation Partnership Project; Technical Specification Group Service and System Aspects; Telecommunication management; Charging management; Circuit Switched (CS) domain charging (Release 8), pp. 1-40.

3GPP TS 36.814 V0.4.1 (Feb. 2009), 3$^{rd}$ Generation Partnership Project; Technical Specification Group Radio Access Network; Further Advancements for E-UTRA Physical Layer Aspects (Release 9), 31 pp.

ETSI TS 148 018 V7.12.0 (Apr. 2008), Digital cellular telecommunications system (Phase 2+); General Packet Radio Service (GPRS); Base Station System (BSS)—Serving GPRS Support Node (SGSN); BSS GPRS protocol (BSSGP) (3GPP TS 48.018 version 7.12.0 Release 7, pp. 1-39.

Vodafone: Discussion on the technical aspects of "Native SMS over LTE", 3GPP TSG SA WG2 Meeting #74; TD S2-094610—Disc on Native SMS Over LTE, 3$^{rd}$ Generation Partnership Project (3GPP), Jul. 6-10, 2009, Sophia Antipolis, France, pp. 1-7, XP050356090.

"3$^{rd}$ Generation Partnership Project; Technical Specification Group Services and System Aspects; Study on Circuit Switched (CS) domain services over evolved Packet Switched (PS) access; Stage 2 (Release 9)", 3GPP TR 23.879 V9.0.0, Mar. 2009, pp. 1-60, XP050364079.

* cited by examiner

MESSAGING IN MOBILE TELECOMMUNICATIONS NETWORKS

TECHNICAL FIELD

This application relates to a method of routing legacy messages between a message centre and a mobile telecommunications device registered with a mobile telecommunications network. This application also relates to a mobile telecommunications network operable to perform such a method.

BACKGROUND TO THE INVENTION

LTE (Long Term Evolution), sometimes referred to as 3.9G, 4G or Evolved Packet System (EPS) is a new and developing Standard in the mobile (cellular) telecommunications network technology. LTE operates entirely in the packet switched (PS) domain, in contrast to 2.5G (GPRS/EDGE) and 3G (UMTs) networks which operate in the circuit switched (CS) and packed switched domains.

Short Message Service (SMS) is the text and (small) data communication service of mobile communication systems, using standardised communications protocols that allow the exchange of short text/data messages between fixed line or mobile devices. SMS text/data messaging is the most widely used data application in the world, currently with 2.4 billion active users.

SMS as used on modern terminals is derived from radio telegraphy in radio memo pagers using standardised protocols, and was defined as part of GSM Standards as a means of sending messages of up to 160 characters or 140 bytes of data, to and from mobile handsets. Support for the service has expanded to include other mobile technologies such as UMTS, ANSI, CDMA and Digital AMPS, as well as satellite and fixed landline networks. Most SMS messages are mobile-to-mobile text messages, though the standard supports other types of broadcast messaging.

As well as conveying text messages between users, SMS is also used for sending notifications to users from the mobile network, such as notifications of roaming costs.

Additionally SMS is used to perform Over The Air (OTA) updates of mobile terminals or their SIM cards—such as to update the preferred networks a mobile terminal will use when roaming. As the size of SMS messages is restricted, updating a list of preferred roaming networks may require a multiplicity of SMS messages (e.g. up to 20 SMS messages). Such OTA messages are typically received and processed by a mobile terminal without the user being aware of any activity.

In 2G, 2.5G and 3G networks, SMS messages can be transmitted in the CS domain or the PS domain. LTE was intended not to operate in the CS domain, so the handling of SMS messages must be processed in the PS domain, or, by another (non-LTE) radio technology. However, since LTE Mobility Management Entities (which will be briefly described below) do not support the legacy Core Network protocols to connect to the SMS system, this presents new challenges The third generation partnership project (3GPP) has recently defined a new concept known as IMS (IP-based Multimedia Subsystem). The IMS is a set of core network servers sitting behind the GGSN (which will be briefly described below) in the packet switched domain. These servers are introduced in order to process signalling between end users. The aim of IMS is to allow users such as mobile telephone network operators to provide services to their subscribers as efficiently and effectively as possible. For example, the IMS architecture is likely to support the following communication types: voice, video, instant messaging, "presence" (a user's availability for contact), location-based services, email and web. Further communication types are likely to be added in the future.

This diverse collection of communication devices requires efficient session management due to the number of different applications and services that will be developed to support these communication types. The 3GPP has chosen Session Initiation Protocol (SIP) for managing these sessions.

The SIP protocol is a session-based protocol designed to establish IP based communication sessions between two or more end points or users. SIP is used for signalling, end-to-end, the initiation, modification and termination of packet switched sessions. Once a SIP session has been established, communication between these end points or users can be carried out using a variety of different protocols (for example those designed for streaming audio and video). These protocols are defined in the SIP session initiation messages.

With IMS, users are no longer restricted to a separate voice call or data session. Sessions can be established between mobile devices that allow a variety of communication types to be used and media to be exchanged. The sessions are dynamic in nature in that they can be adapted to meet the needs of the end users. For example, two users might start a session with an exchange of instant messages and then decide that they wish to change to a voice call, possibly with video. This is all possible within the IMS framework. If a user wishes to send a file to another user and the users already have a session established between each other (for example, a voice session) the session can be redefined to allow a data file exchange to take place. This session redefinition is transparent to the end user.

One proposal for handling SMS messages in LTE networks is to transmit them using IMS. However, IMS is a complex Standard, and will not be employed in all networks/handsets at least initially.

Another proposal for handling SMS messages in LTE networks is to use the "Circuit Switched Fall Back" mechanism defined in 3GPP TS 23.272, which is fully incorporated herein by reference. The "Circuit Switched Fall Back" mechanism was originally intended for voice call handling and envisaged the mobile temporarily moving from LTE access to 2G or 3G access. SMS was added as an after-thought and then 'optimised' such that a change of radio technology was not needed. As a result, the solution for supporting MSC based SMS in LTE is unnecessarily complicated for the purpose of SMS support alone, especially if the network does not support legacy 3GPP 3G or 2G access.

The current handling of SMS in TS 23.272 requires full MSC/VLR (Mobile services Switching Centre/Visitor Location Register) functionality that supports mobility management from a CS perspective. The MSC/VLR is an expensive piece of equipment. If "Idle mode" mobility between LTE and GPRS/EDGE Radio Access Network (GERAN)/UMTS Terrestrial Radio Access Network (UTRAN) (i.e. 2G/3G) networks is active, this will furthermore have impacts on the 2G/3G core networks in terms of signalling load or requiring deployment of the Gs interface.

SUMMARY OF THE INVENTION

According to the system described herein, there is provided a method of routing legacy messages between a message centre and a mobile telecommunications device registered with a mobile telecommunications network, which mobile telecommunications network includes a plurality of base stations each serving a plurality of mobile telecommunications devices, and a plurality of mobility management entities, each serving a plurality of said base stations, the mobility management entities being adapted to communicate using a legacy protocol with a legacy network for routing the legacy messages between the message centre and the mobile telecommunications device via the legacy network, characterised by providing a legacy message interworking function for communicating with the mobility management entities using the legacy protocol and for directly routing messages between the mobility management entities and the message centre without routing the messages via the legacy network.

The legacy message may be a SMS (text or data) message.

The legacy protocol may be an SGs Interface protocol, conventionally used between an MSC and the mobility management entity.

The legacy message interworking function may communicate with a register within the legacy network to obtain routing information for the legacy message —for example, the register may be an HLR/HSS.

The mobility management entities may use a modified 3GPP Release 8 protocol to communicate with the legacy message interworking function.

The message interworking function may have a plurality of addresses, each of which corresponds to one of said mobility management entities for routing messages between mobility management entities and the message centre in dependence upon the one of said addresses is associated with the message.

In the embodiment to be described, when the mobile telecommunications device performs mobility management procedures, the mobility management entity determines whether the mobile telecommunications device is already known in the mobility management entity and whether an existing SGs association exists. If there is no SGs association for that mobile telecommunications device, the mobility management entity establishes an SGs association with the message interworking function. The message interworking function does not have the equivalent of a VLR, and so, the message interworking function contacts the register to inform the register that the mobile telecommunications device has arrived in a "new MSC/VLR area". In the signalling from the message interworking function to the register, the message interworking function identifies itself by the address that corresponds to the mobility management entity that the mobile telecommunications device is registering on. The register stores this particular message interworking function address as the address of the "MSC/VLR on which the mobile telecommunications device is registered in the CS domain" Subsequently when a mobile terminating legacy message is received at the message centre, the message centre asks the register for the mobile telecommunications device's current MSC/VLR address. The register returns the stored address and this address information is both used to relay the legacy message to the message interworking function, and, is contained within the relayed information. The message interworking function then analyses the address information to determine on which mobility management entity the mobile telecommunications device is currently registered, and then uses the TS 23.272/TS 29.118 procedures to deliver the legacy message to the mobile telecommunications device.

The method may include selectively barring the transmission of legacy messages.

The mobile telecommunications network may operate only in the packet switched domain and the legacy message may be transmitted in the legacy network in the circuit switched domain. For example, the mobile telecommunications network may be a 4G/LTE/EPS network.

It should be understood that the "mobility management entities" referred to in this Summary and in the Claims are entities able to manage the mobility of mobile telecommunications devices in the network. The "mobility management entities" do not necessarily include the features of an LTE Mobility Management Entity (MME) as essential features, although such features are optional features of the "mobility management entities".

According further to the system described herein, there is provided a mobile telecommunications network including: a plurality of mobile telecommunications devices registered with the mobile telecommunications network; a plurality of base stations each serving a plurality of the mobile telecommunications devices, and a plurality of mobility management entities, each serving a plurality of the base stations, the mobility management entities being adapted to communicate using a legacy protocol with a legacy network for routing legacy messages between a message centre and the mobile telecommunications devices via the legacy network, characterised by a legacy message interworking function for communicating with the mobility management entities using the legacy protocol and operable to directly route messages between the mobility management entities and the message centre without routing the messages via the legacy network.

According further to the system described herein, a non-transitory computer readable medium stores computer software for routing legacy messages between a message centre and a mobile telecommunications device registered with a mobile telecommunications network, the mobile telecommunications network including a plurality of base stations each serving a plurality of mobile telecommunications devices, and a plurality of mobility management entities, each serving a plurality of said base stations, the mobility management entities being adapted to communicate using a legacy protocol with a legacy network for routing the legacy messages between the message centre and the mobile telecommunications device via the legacy network. The computer software includes executable code that provides a legacy message interworking function for communicating with the mobility management entities using the legacy protocol and for directly routing messages between the mobility management entities and the message centre without routing the messages via the legacy network.

BRIEF DESCRIPTION OF THE DRAWINGS

Embodiments of the system described herein will be explained in detail on the basis of the figures, which are briefly described as follows.

In the drawings like elements are generally designated with the same reference sign.

DETAILED DESCRIPTION OF VARIOUS EMBODIMENTS

A mobile telecommunications network in which the system described herein may be implemented may include a plurality of base stations, each serving a plurality of mobile telecommunications devices, and a plurality of mobility management entities, each serving a plurality of said base stations, the mobility management entities being adapted to communicate using a legacy protocol with a legacy network for routing the legacy messages between the message centre and the mobile telecommunications device via the legacy network.

Figure 1:
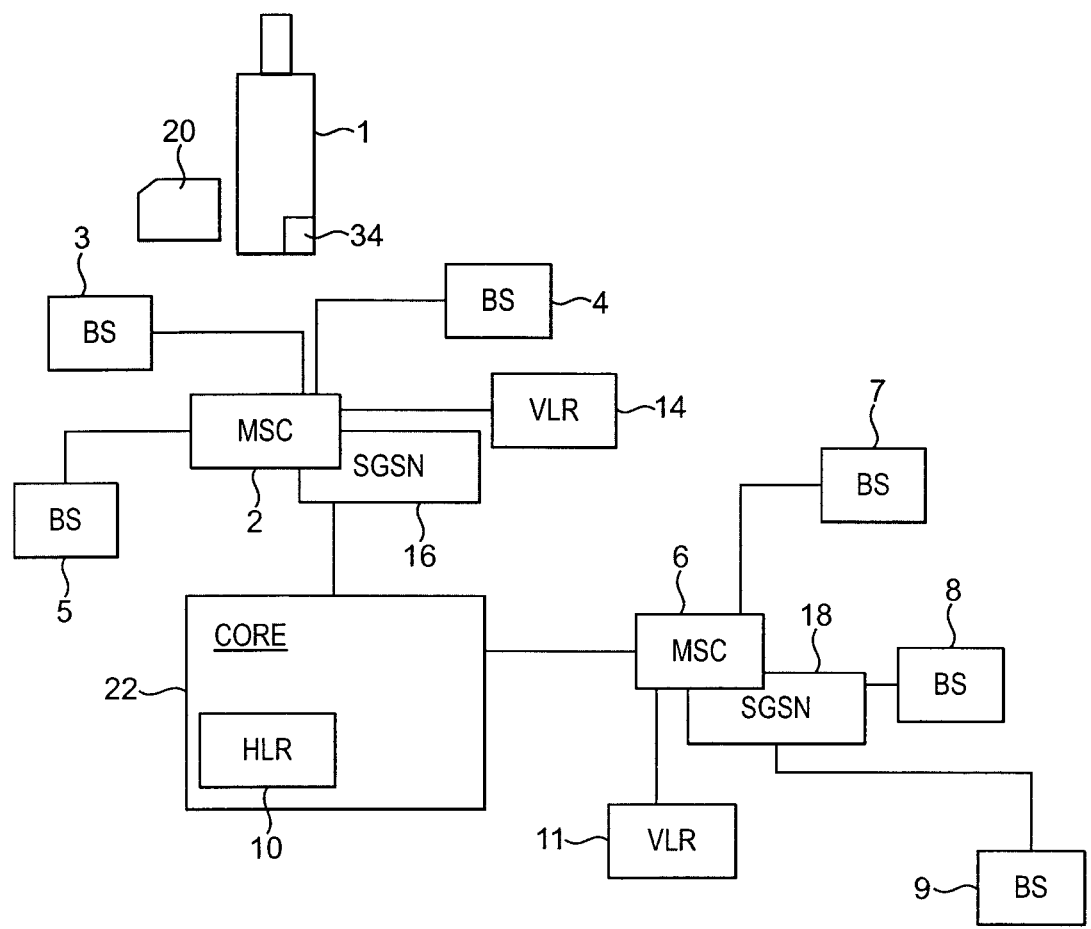
FIG. 1 shows schematically elements of a mobile/cellular telecommunications network that may be used in connection with the system described herein.

Certain elements of a mobile or cellular telecommunications network, and its operation, will now briefly be described with reference to FIG. 1.

Each base station (BS) corresponds to a respective cell of its cellular or mobile telecommunications network and receives calls from and transmits calls to a mobile device in that cell by wireless radio communication in one or both of the circuit switched or packet switched domains. Such a subscriber's mobile device is shown at 1. The mobile device may be a handheld mobile telephone, such as a smart phone, a wireless dongle or the like In a GSM (2, 2.5 G) mobile telecommunications network, each base station comprises a base transceiver station (BTS) and a base station controller (BSC). A BSC may control more than one BTS. The BTSs and BSCs comprise the radio access network.

In a UMTS (3G) mobile telecommunications network, each base station comprises a node B and a radio network controller (RNC). An RNC may control more than one node B. The node Bs and RNCs comprise the radio access network.

In an LTE (4G) mobile telecommunications network, each base station comprises an eNode B (eNB). The base stations are arranged in groups, and each group of base stations is controlled by a Mobility Management Entity (MME) and a Serving/Packet Data Network Gateway (SGW/PGW).

Conventionally, the 2, 2.5 and 3G base stations are arranged in groups and each group of base stations is controlled by one mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated connection to their MSC 2 or MSC 6—typically a cable connection.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain. Respective SGSNs 16 and 18 may be connected to the respective MSCs 2 and 6 by a Gs Interface.

Each subscriber to the network is provided with a smart card or SIM card 20 which, when associated with the user's mobile device 1 identifies the subscriber to the network. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, using which callers initiate calls to the subscriber. This number is the MSISDN.

The network includes a home location register (HLR) 10 or Home Subscriber Server (HSS) which, for each subscriber to the network, stores the IMSI and the corresponding MSISDN together with other subscriber data, such as service subscription information, and the current or last known MSC and/or SGSN of the subscriber's mobile device 1.

When mobile device 1 is activated, it registers itself in the network by transmitting the IMSI (read from its associated SIM card 20) to the base station 3 associated with the particular cell in which the device 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the core network 22 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 6 in the manner described above, the HLR 10 additionally performs an authentication procedure for the mobile device 1. The HLR 10 transmits authentication data to the MSC 2 in "challenge" and "response" forms. Using this data, MSC 6 passes a "challenge" to the mobile device 1 through base station 7. Upon receipt of this data, the mobile device 1 passes this data to its SIM and produces a "response". This response is generated using an encryption algorithm on the SIM and a unique key Ki on the SIM. The response is transmitted back to the MSC 6 which checks it against its own information for the subscriber which checks it against information that it has obtained for that subscriber from the HLR 10 in order to complete the authentication process. If the response from the mobile device 1 is as expected, the mobile device 1 is deemed authenticated. At this point the MSC 6 requests subscription data from the HLR 10. The HLR 10 then passes the subscription data to the VLR 14.

The authentication process will be repeated at regular intervals while the mobile device 1 remains activated and can also be repeated each time the mobile device 1 makes or receives a call, if required. This authentication process confirms the identity of the user to the network, so the user can be charged for telecommunications services.

Each of the MSCs of the network (MSC 2 and MSC 6) has a respective VLR (14 and 11) associated with it and operates in the same way as already described when a subscriber activates a mobile device 1 in one of the cells corresponding to one of the base stations controlled by that MSC.

When the subscriber using mobile device 1 wishes to make a call, they enter the telephone number of the called party in the usual manner. This information is received by the base station 3 and passed on to MSC 2. MSC 2 routes the call towards the called party. Using the information held in the VLR 14, MSC 2 can associate the call with a particular subscriber and thus record information for charging purposes.

In order to ensure subscriber identity confidentiality the MSC/VLR 2/14 and SGSN 16 may allocate a TMSI (Temporary Mobile Subscriber Identity) to a mobile device. The MSC/VLR and SGSN are able to correlate an allocated TMSI with the IMSI of the mobile device. A mobile device may be allocated two TMSIs, one for services provided through the MSC/VLR, and the other known as the P-TMSI (Packet TMSI) for services provided through the SGSN.

Cellular telecommunications networks provide a separation of the "control plane" and the "user plane". The control plane performs the required signalling, and includes the relevant application protocol and the signalling bearer for transporting the application protocol messages. Among other things, the application protocol is used for setting up the radio access bearer in the radio network layer. The user plane transmits data traffic and includes data streams and data bearers for the data streams. The data streams are characterised by one or more frame protocols specified for that interface.

Generally speaking, the user plane carries data for use by a receiving terminal —such as data that allows a voice or picture to be reproduced—and the control plane controls how the data is transmitted. The user plane and control plane of LTE are described in Specification 3GPP TR 36.814—which is fully incorporated herein by reference.

Mobile networks such as 2G, 2.5 (GSM), 3G (UMTS) and 4G (LTE) telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Calculations to determine whether to perform a handover from one base station to another base station are performed by the network, whereas calculations whether to perform cell reselection are performed by the mobile terminal.

In a mobile network operating in accordance with the 3G (UMTS) Standards, a mobile terminal device (UE) has a so-called "RRC (Radio Resource Control) state" which depends on its state of activity. In the respective RRC states different functions for mobility are executed. These functions are described in technical specification 3GPP TS 25.304/25.331, which are fully incorporated herein by reference.

For 2G and 3G, a mobile terminal is in active communication when it has a CS (Circuit Switched) connection established.

In 2.5G, GPRS PS (Packet Switched), active communication can be defined as the GPRS Ready state. In 3G UMTS PS, active communication can be defined as the RRC connected mode state that is CELL DCH, and thus excluding CELL/URAPCH RRC connected mode states.

In 3G UMTS PS, CELL/URA_PCH and CELL_FACH can be defined as inactive states. In 2.5G GPRS PS, the Standby state can be regarded as an inactive state.

For example in the CELL DCH state a network-driven handover is performed when necessary, as described in 3GPP TS 25.331. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC on an event-driven basis, e.g. when the signal strength or signal-to-noise ratio of one of the cells exceeds a threshold. The information list is used by a handover algorithm implemented in the UTRAN RNC. The algorithm that determines when handover occurs is not specified in the GSM or UMTS Standards. The algorithms essentially trigger a handover when the mobile terminal 1 provides a measurement of a neighbour cell received signal at the mobile terminal 1 below a predetermined quality received threshold, which typically has a relation to the quality of the received signal from the serving cell (e.g. better quality by some margin).

In the "CELL_FACH", "CELL_PCH", "URA_PCH" or "idle mode" the mobile terminal controls its own mobility independently and starts a cell switch (reselection) when a neighbouring cell has a better quality than the current cell, as described in 3GPP TS 25.304. A similar procedure is also used in GSM/GPRS mobile networks, as described in technical specification 3GPP TS05.08 (UE-based cell reselection).

In general, a mobile terminal in "idle mode" states and in RRC connected mode (inactive) states "CELL_FACH", "CELL_PCH" and "URA_PCH" performs periodic measurements of its own as well as of a series of neighbouring cells—typically of the BCCH or other cell broadcast channel transmitted on the RF carrier of each base station. The broadcast control channel (BCCH) is the downlink channel that contains parameters needed by a mobile in order that it can identify the network and gain access to it. Typical information includes the Location Area Code (LAC) and Routing Area Code (RAC), the MNC (Mobile Network Code) and the BA (BCCH Allocation) list. The measurements are not made continuously, as this would be wasteful of battery power. Instead, these measurements are performed at a frequency determined by a Cell Measurement Cycle Length (CMCL). Information about the neighbouring cells is broadcast in the system information block 11 (SIB 11) or system information block 12 (SIB 12) of the broadcast channel (BCH) as described in 3GPP TS 25.304 and 3GPP TS 25.331.

A switch from the current cell to a neighbouring cell generally takes place in the aforementioned idle/inactive states when a neighbouring cell is technically better than the current cell. It is thus ensured that a mobile terminal is generally located in the cell of a mobile network in which it needs the lowest possible transmitting power in order to contact the closest base station (NodeB) and/or has the best reception conditions.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network (that is, cell reselection has been performed), the precise cell in which the mobile terminal is located may not be known. It will therefore be necessary to perform paging in a number of cells. The greater the number of cells in which paging must occur, the more use of valuable signalling capacity within the network.

However, if the HLR/HSS 10 is to always have an up-to-date record of the cell in which each mobile terminal is located so that the current cell which is occupied by a terminal is always known, this will require a large amount of location updating signalling between the mobile terminal and the HLR/HSS 10 in order that the HLR/HSS 10 has up-to-date records of the cells occupied by each mobile terminal. This is also wasteful of valuable signalling capacity.

As indicated above, the HLR/HSS 10 is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner in 2G and 3G networks by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routeing area relates to a particular geographical area for communications in the packet-switched domain. Typically, although not necessarily, a routeing area is larger than the area of a single cell but is smaller than the area covered by one SGSN. A routeing area is typically, although not necessarily, smaller than a location area. There may be many routeing areas within one location area. Each cell within the network broadcasts data indicative of its routeing area (RAI) in addition to the data mentioned above indicative of the identity of its location area. The mobile terminal uses this received data to determine when it has moved to a new routeing area. The terminal stores the last known routeing area on its SIM. The information stored on the SIM is compared with the routeing area information broadcast by the local cell. The identities of the two routeing areas are compared. If they are different, the mobile terminal determines that it has entered a new routeing area. The mobile terminal then gains access to a radio channel and requests a routing area update (RAU). The routeing area is updated in the same manner as the location area, as discussed above.

The Gs Interface between the SGSN and the MSC (VLR) uses the Base Station System Application Protocol Plus (BSSAP+) protocol. The Gs Interface is described in 3GPP TS 29.016, which is fully incorporated herein by reference. The Gs Interface allows for the coordination of circuit-switched and packet-switched paging in the SGSN as well as location information of any mobile device attached to both circuit and packet services. When the mobile device is attached to the GPRS network, the SGSN keeps track of which routing area (RA) the station is attached to. Knowledge of the RA allows the LA to be derived. When a station is paged this information is used to conserve network resources.

Signalling messages are typically transported between signalling points of a telecommunications system using a Signalling System No. 7 (SS7) network. The protocol stack for SS7 comprises three Message Transfer Parts (MTP levels 1 to 3) and a Signalling Connections and Control Part (SCCP). The nature of the MTP layers will not be described in detail here other than to note that they perform routing and error correction roles amongst other things.

SS7 is used by a number of application and user parts such as an ISDN User Part (ISUP), a Telephony User Part (TUP), a Transaction Capabilities Application Part (TCAP), and the BSSAP+ protocol. BSSAP+ (like TCAP) makes use of SS7 via the SCCP. A role of the SCCP is to provide subsystem numbers to allow messages to be addressed to specific applications (called subsystems) at network signalling points.

A typical sequence of signalling messages over the Gs interface, between a SGSN and a MSC/VLR using the BSSAP+ protocol arises during a location area update, such as when a mobile subscriber enters the coverage area of a new BSC, and comprises: a BSSAP Location Update Request sent from the SGSN to the VLR; a BSSAP Location Update Accept returned from the VLR to the SGSN; and a BSSAP TMSI reallocation complete message sent from the SGSN to the VLR. In this way, when an RAU is performed, the VLR is advised via the Gs Interface, of the change in location of the mobile device, and whether separate LAU (and associated authentication) is required.

In a UMTS/GSM network, as discovered above, the coverage area of the mobile telecommunications network is divided into a plurality of location areas (LAs) and into a plurality of routing areas (RAs). The equivalent areas in an LTE network are referred to as tracking areas (TAs).

The functionality just described may also apply to the proposed LTE mobile telecommunications network, with its eNode Bs performing the functionality of the base stations and the MME/UPE performing the functionality of the MSCs/VLRs.

From a mobility perspective, the UE can be in one of three states, LTE_DETACHED, LTE_IDLE, and LTE_ACTIVE. LTE_DETACHED state is a transitory state in which the UE is powered-on but is in the process of searching and registering with the network. In the LTE_ACTIVE state, the UE is registered with the network and has an RRC connection with the eNB. In LTE_ACTIVE state, the network knows the cell to which the UE belongs and can transmit/receive data from the UE. The LTE_IDLE state is a power-conservation state for the UE, where typically the UE is not transmitting or receiving packets. In LTE_IDLE state, no context about the UE is stored in the eNB. In this state, the location of the UE is only known at the MME and only at the granularity of a tracking area (TA) that consists of multiple eNBs. The MME knows the TA in which the UE last registered and paging is necessary to locate the UE to a cell.

Figure 2:
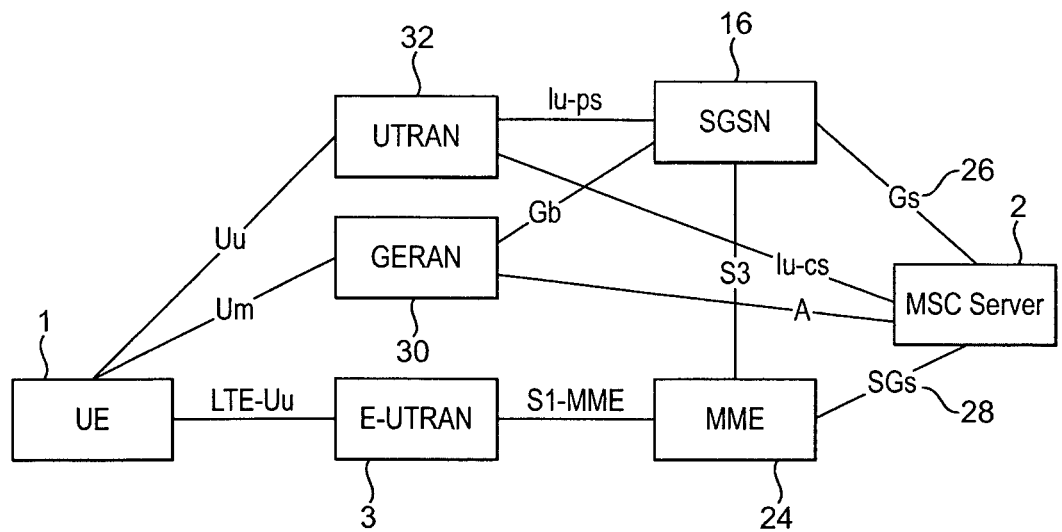
FIG. 2 shows the known "Circuit Switched Fall Back" architecture.

"Circuit Switched Fall Back" mechanism defined in 3GPP TS 23.272 is shown in FIG. 2. Two new interfaces are defined:—

SGs: It is the reference point between the MME 24 and MSC server 2. The SGs reference point is used for the mobility management and paging procedures between EPS and CS domain, and is based on the Gs interface procedures. The SGs reference point is also used for the delivery of both mobile originating and mobile terminating SMS.

S3: It is defined in TS 23.401 with the additional functionality to support Idle-mode Signalling Reduction (ISR) for CS fallback/SMS over SGs as defined in this Specification. ISR is a mechanism that allows the UE to remain simultaneously registered in an UTRAN/GERAN Routing Area (RA) and an E-UTRAN Tracking Area (TA) list. This allows the UE to make cell reselections between E-UTRAN and UTRAN/GERAN without a need to send any TAU or RAU request, as long as it remains within the registered RA and TA list. Consequently, ISR is a feature that reduces the mobility signalling and improves the battery life of UEs. This is important especially in initial deployments when E-UTRAN coverage will be limited and inter-RAT changes will be frequent. The cost of ISR is more complex paging procedures for UEs in ISR, which need to be paged on both the registered RA and all registered TAs. The HSS needs also to maintain two PS registrations (one from the MME and another from the SGSN).

According to the "Circuit Switched Fall Back" mechanism, to allow a CS voice call, the mobile device falls back from LTE to GSM or UMTS for incoming and outgoing voice calls.

When an GSM/UMTS/LTE capable device first connects to the EPS i.e. to LTE via eNodeB 23, it indicates to the network that it wants to perform a "Combined Update". That is, the device to also register its presence in the 2G/3G circuit switched network. Registration of the device in the 2G/3G network is performed by the MME (Mobility Management Entity) LTE network element 24. The MME 24 does this by connecting to a "legacy" 2G/3G Mobile Switching Centre (MSC) 2 via an SGs interface 28, which (as mentioned above) is an extension of the conventional Gs interface 26 between the SGSN 16 and the MSC 2. In effect, the MME 24 appears to the MSC 2 as an SGSN, and the MSC 2 then communicates with the device 1 (via the MME 24) as if it was attached to the 2G/3G network, rather than the LTE network and performs a location update via the SGSN 16. This provides backwards compatibility with only minor changes required to the MSC 2.

For the registration in the 2G/3G network, the MME 24 provides the MSC 2 with a 2G/3G Location Area ID (LAI). As the device is not connected to the 2G/3G RAN, no LAI is available, and the device cannot tell the MME this value. The value is therefore derived from the TAI, which is the corresponding identifier in LTE. In practice this creates a dependency between the TAI and the LAI, i.e. the location areas that describe a group of base stations in 2G/3G and LTE must be configured in a geographically similar way in order for the fallback to work.

The attach procedure for the CS fallback (CSFB) and SMS over SGs in EPS is realized based on the combined GPRS/EMSI Attach procedure specified in TS 23.060, which is fully incorporated herein by reference, and will now be described with reference to FIG. 3. The steps are as follows:—

1) The mobile terminal 1 initiates the attach procedure by the transmission of an Attach Request (with parameters as specified in TS 23.401 including the Attach Type and Mobile Station Classmark 2) message to the MIME 24. The Attach Type indicates that the mobile terminal 1 requests a combined EPS/IMSI attach and informs the network that the mobile terminal 1 is capable and configured to use CS fallback and/or SMS over SGs 28. If the mobile terminal 1 needs SMS service but not call fall back, the mobile terminal 1 includes an "SMS-only" indication in the combined EPS/IMSI Attach Request.

2) Step 3 to step 16 of the EPS Attach procedure are performed as specified in TS 23.401.

3) The VLR 14 is updated according to the combined GPRS/IMSI Attach procedure in TS 23.060 if the Attach Request message includes an Attach Type indicating that the mobile terminal 1 requests a combined EPS/IMSI attach. The MME 24 allocates a LAI for the mobile terminal 1. If multiple PLMNs are available for the CS domain, the MME 24 performs selection of the PLMN for CS domain based on selected PLMN information received from the eNodeB 23, current TAI and operator selection policies. The PLMN selected for CS should be the same that is used for this mobile terminal 1 as a target PLMN for PS handovers or for any other mobility procedures related to CSFB. The selected PLMN ID is included in the LAI which is sent to MSC/VLR 2/14 in step 4 and in Attach Accept to the mobile terminal 1.

The MME 24 derives a VLR number based on the allocated LAI and on an IMSI hash function defined in TS 23.236. The MME 24 starts the location update procedure towards the new MSC/VLR 2/14 upon receipt of the subscriber data from the HSS 10 in step 2). This operation marks the IMSI as EPS-attached in the VLR 14.

4) The MIME 24 sends a Location Update Request (new LAI, IMSI, MME name, Location Update Type) message to the VLR 14. The MME 24 name is a FQDN string.

5) The VLR 14 creates an association with the MME 24 by storing MME name.

6) The VLR 14 performs Location Updating procedure in CS domain.

7) The VLR 14 responds with Location Update Accept (VLR TMSI) to the MME 24.

8) The EPS Attach procedure is completed by performing step 17 to step 26 as specified in TS 23.401. The Attach Accept message includes the parameters as specified in TS 23.401: VLR TMSI and LAI as allocated in step 3 above. The existence of LAI and VLR TMSI indicates successful attach to CS domain.

If the mobile terminal 1 requests combined EPS/IMSI Attach Request without the "SMS-only" indication, and if the network supports only SMS over SGs, the network performs the IMSI attach and the MME 24 indicates in the Attach Accept message that the IMSI attach is for "SMS-only". When the network accepts a combined EPS/IMSI attach without limiting to "SMS-only", the network may provide a "CSFB Not Preferred" indication to the mobile terminal 1.

If the mobile terminal 1 requests combined EPS/IMSI Attach Request with the "SMS-only" indication, and if the network supports SMS over SGs only or if it supports CSFB and SMS over SGs, the network performs the IMSI attach and the MME 24 indicates in the Attach Accept message that the IMSI attach is for "SMS-only".

The network provides the "SMS-only" or "CSFB Not Preferred" indications based on locally configured operator policies based on e.g. a roaming agreement.

The mobile terminal 1 behaviour upon receiving such indications is described in TS 23.221.

After the attach procedure is completed, calls can then be handled.

The procedure for a Mobile Terminated (MT) call will now be described.

When a circuit switched call comes in for the subscriber it arrives at the MSC 2. The MSC 2 then signals the incoming call via the SGs interface 28 to the MME 24 (in the same way as if the MME 24 was a 2G or 3G SGSN). If the mobile 1 is in the active state, the MME 24 forwards the request immediately to the mobile device 1. To receive the call the device 1 signals to the MME 24 that it should be handed over to the 2G or 3G network in which it can receive the call. The MME 24 then informs the eNodeB 23 that the mobile 1 has to be handed over to a 2G/3G network base station (BTS 30 or NodeB 32).

If the mobile 1 is in the idle state when the voice call is received, the MME 24 pages the mobile. Once contact has been re-established, the MME 24 forwards information about the call.

The eNodeB 23 may request 2G/3G measurements from the device 1 for use in determining to which cell to hand over the mobile 1. Once the mobile device is in the 2G or 3G cell it answers to the initial paging via the legacy cell 30, 32.

In case the MME 24 has made a mistake and the legacy cell is in a different location area than where the device was registered in the preparation phase, the Specification also contains a mechanism to first perform a location update and then reroute the waiting voice call to the new location area or even to an entirely different MSC.

The procedure for a Mobile Originated (MO) call is very similar to the mobile terminated call example above. The difference is that there is no paging coming from the network for an incoming call and of course no paging response to the MSC 2 after the device is in the legacy cell.

For receiving SMS messages, the mobile device 1 can remain attached to the LTE network. The SMS is forwarded by the MSC 2 to the MME 24 via the SGs interface 28 (in the same way that the MSC 2 communications with the SGSN 16 via the Gs interface) and from there via RRC signalling over the LTE radio network to the mobile device 1. Sending text messages works in a similar way, there is no need to fall back to a legacy network.

The procedures for SMS in the Specification apply only if the mobile terminal 1 is EPS/IMSI attached and the CS access domain is chosen by the mobile terminal 1 and/or the home PLMN for delivering SMS messages.

SMS support is based on the connectionless SGs reference point 28 between the MME 24 and the MSC Server 2 and use of NAS signalling between the mobile terminal 1 and the MME 24, i.e. full CS Fallback is not performed for SMS, and the SMS message is transmitted using the LTE RAN.

The SMS protocol entities are reused from the existing MS/mobile terminal 1 and MSC implementations. This means that the SMS over SGs 28 procedures reuse the different protocol layers as defined in 3GPP TS 23.040, which is fully incorporated herein by reference.

The SMS procedures will now be described in more detail.

Mobile originating SMS in Idle Mode

Figure 4:
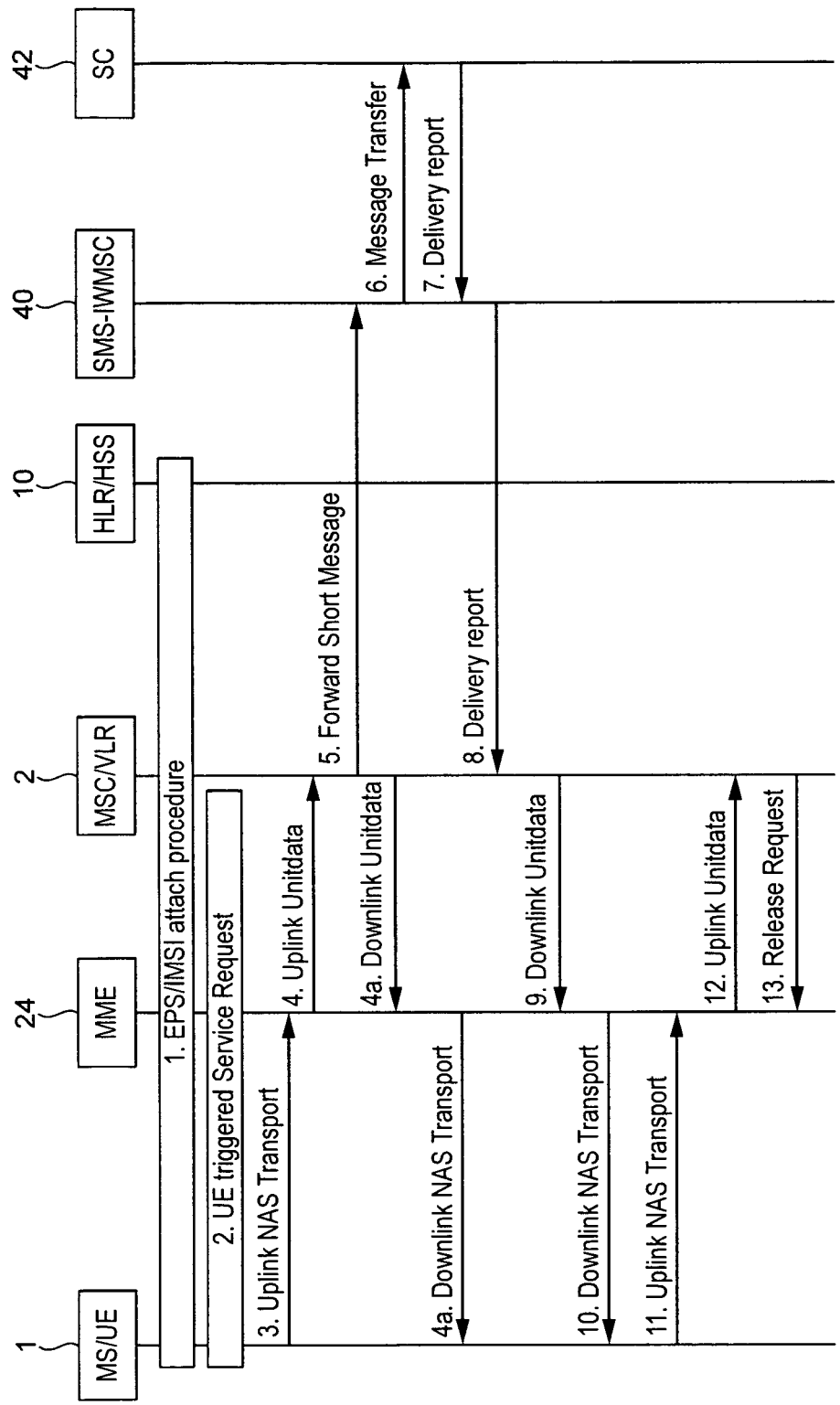
FIG. 4 shows the conventional TS 23.272 procedure for Mobile Originating SMS in idle mode.

The following sequence flow in FIG. 4 shows the delivery of mobile originating SMS in idle mode. The message flows between the ME/UE/mobile terminal 1 and MSC/VLR 2/14 are also broadly applicable to the Memory Available Notification.

1. The combined EPS/IMSI attach procedure as described with reference to FIG. 3 is performed.

2. A mobile originating SMS is triggered and the MS/mobile terminal 1 is in idle mode. The MS/mobile terminal 1 initiates the mobile terminal triggered Service Request procedure, which is defined in TS 23.401. The mobile terminal 1 indicates its S-TMSI in the RRC signalling. The S-TMSI is similar in format to the P-TMSI. It is used to protect the subscriber's IMSI during NAS interaction as well as identifying the MME 24 or MME pool that is responsible for the mobile terminal 1. The S-TMSI is constructed from the MMEC (MME Code) and the M-TMSI (MME TMSI).

3. The MS/mobile terminal 1 builds the SMS message to be sent as defined in TS 23.040 (i.e. the SMS message consists of CP-DATA/RP-DATA/TPDU/SMS-SUBMIT parts). Following the activation of the Radio Bearers, the SMS message is encapsulated in an NAS message and sent to the MME 24.

4. The MME 24 forwards the SMS message to the MSC/VLR 2 in an

Uplink Unitdata message. In order to permit the MSC 2 to create an accurate charging record, the MME 24 adds the TMEISV, the local time zone, the Mobile Station Classmark 2, and the mobile terminal's current TAI and E-CGI.

4a. The MSC/VLR 2 acknowledges receipt of the SMS to the mobile terminal 1.

5.-8. These steps are performed as defined in TS 23.040. The SMS message is forwarded to the SMS InterWorking MSC (SMS-IWMSC) 40 and then to the Service Centre (SC) 42. The SC returns a delivery report message.

9. The MSC/VLR 2 forwards the received delivery report to the MME 24 associated with the MS/mobile terminal 1 in a Downlink Unitdata message.

10. The MME 24 encapsulates the received delivery report in an NAS message and sends the message to the MS/mobile terminal 1.

11, 12. The mobile terminal 1 acknowledges receipt of the delivery report to the MSC/VLR 2.

13. The MSC/VLR 2 indicates to the MME 24 that no more NAS messages need to be tunnelled.

Mobile Originating SMS in Active Mode

The Mobile Originating SMS in active Mode procedure reuses the Mobile Originating SMS in Idle Mode with the following modification:

The established signalling connection between the MS/mobile terminal 1 and the MME 24 is reused for the transport of the SMS message and the delivery report (i.e. the mobile terminal 1 triggered Service Request procedure defined in step 2 is skipped).

Mobile Terminating SMS in Idle Mode

Figure 5:
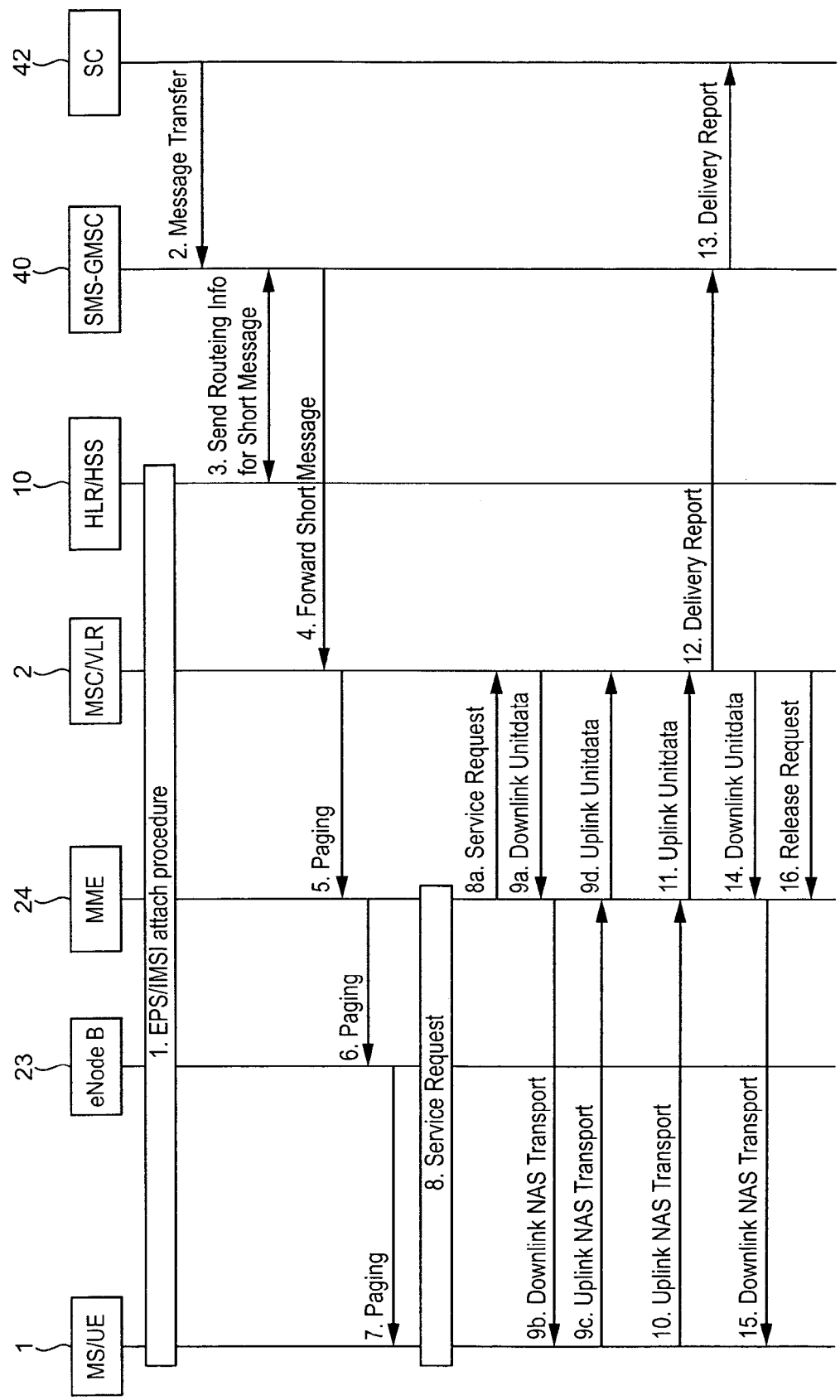
FIG. 5 shows the conventional TS 23.272 procedure for Mobile Terminating SMS in idle mode.

The following sequence flow in FIG. 5 shows the delivery of mobile terminating SMS in idle mode.

1. The combined EPS/IMSI attach procedure as described with reference to FIG. 3 is performed.

2-4. The SC 42 initiates transfer of mobile terminating SMS. The HLR 10 is requested for a routing number for SMS services and the SMS message is forwarded to the MSC/VLR 2/14 where the MS/mobile terminal 1 is CS attached.

5. The MSC/VLR 2/14 sends a Paging (IMSI, VLR TMSI, Location Information, SMS indicator) message to the MME 24 over the SGs interface.

6. The MME 24 initiates the paging procedure by sending the Paging (as specified in TS 23.401) message to each eNodeB 23 with cells belonging to the tracking area(s) in which the mobile terminal 1 is registered. The mobile terminal 1 is paged with its S-TMSI.

7. The MS/mobile terminal 1 is paged by the eNodeBs 23.

8. The mobile terminal 1 sends a Service Request message to the MME 24. The mobile terminal 1 indicates its S-TMSI in the RRC signalling. The MME 24 sends the S1-AP Initial Context Setup Request message to the eNodeB 23 and the eNodeB 23 establishes the Radio Bearers.

8a. The MME 24 sends a Service Request message to the MSC 2. In order to permit the MSC 2 to create an accurate charging record, the MME 24 adds the IMEISV, the local time zone, the Mobile Station Classmark 2, and the mobile terminal's current TAI and E-CGI.

9a. The MSC/VLR 2 builds the SMS message to be sent as defined in TS 23.040 (i.e. the SMS message consists of CP-DATA/RP-DATA/TPDU/SMS-DELIVER parts). The MSC/VLR 2 forwards the SMS message to the MME 24 in a Downlink Unitdata message.

9b. The MME 24 encapsulates the SMS message in a NAS message and sends the message to the MS/mobile terminal 1.

9c, 9d. The MS/mobile terminal 1 acknowledges receipt of the SMS message to the MSC/VLR 2.

10. The MS/mobile terminal 1 returns a delivery report as defined in TS 23.040. The delivery report is encapsulated in an NAS message and sent to the MME 24.

11. The MME 24 forwards the delivery report to the MSC/VLR 2 in an Uplink Unitdata message.

12-13. These steps are performed as defined in TS 23.040. The delivery report is forwarded to the SC.

14-15. In parallel to steps 12-13, the MSC/VLR 2 acknowledges receipt of the delivery report to the MS/mobile terminal 1.

16. The MSC/VLR 2 indicates to the MME 24 that no more NAS messages need to be tunnelled.

Mobile Terminating SMS in Active Mode

Mobile terminating SMS in Active Mode procedure reuses the Mobile Terminating SMS in Idle Mode with the following modification:

There is no need for the MME 24 to perform Paging of the MS/mobile terminal 1 after step 5. MME 24 continues with step 8a (i.e. steps 6 to 8 are skipped). The MME 24 immediately sends a Downlink Unitdata to the mobile terminal 1.

Unsuccessful Mobile Terminating SMS Delivery Attempt

As specified in clause 3.2.8 of TS 23.040, setting the Mobile Station Not Reachable Flag (MNRF) in the MSC/VLR 2 is mandatory. However, when using the SGs interface 28, the MSC/VLR 2 has delegated the 'implicit detach' functionality to the MME 24 (and/or, if Network Mode of Operation 1 is in use in GERAN/UTRAN, to the SGSN 16).

If an SGs based MT SMS delivery attempt fails, the MSC/VLR 2 sets its MNRF and sends a SGs interface Alert Request message to the MIME 24. Upon receipt of Alert Request message, MME sets its Non-EPS Alert Flag (NEAF) and if ISR is activated, the MME 24 then sends an S3 interface Alert-MIME-Request message to the SGSN 16. The SGSN 16 sets the S3 SMS Alert Flag (SSAF).

If the MME 24 operator knows (e.g. because it is in the HPLMN) that the receiving mobile terminal's HPLMN deploys SMS-Router, and if the receiving mobile terminal's HPLMN uses both SMS via MSC and SMS via SGSN, then the MME 24 need not send the Alert-MME-Request message to the SGSN 16 for that mobile terminal 1.

NOTE: The receiving mobile terminal's HPLMN should ensure that the SMS-Router in the receiving mobile terminal's HPLMN only returns SMS-Router address to the SMS-GMSC of the sender mobile terminal's PLMN.

Subsequently, if the mobile terminal 1 makes radio contact with the SGSN 16 and SSAF is set, the SGSN 16 informs the MME 24 with an S3 UE-Activity-Indication. Upon receipt of the S3 interface UE-Activity-Indication, or, if the mobile terminal 1 makes radio contact with the MME 24, the MME 24 sends an SGs AP UE-Activity-Indication message to the MSC/VLR 2. Upon receipt of an SGs AP UE-Activity-Indication message, or signalling on the A, Iu-cs or Gs interface for that mobile terminal 1, the MSC/VLR 2 informs the HLR 10.

Non-SMS Mobile Terminating Activity During SMS Delivery

While one or more SMS messages is/are being transferred, other mobile terminating requests (e.g. an mobile terminated voice call) may arrive in the MSC/VLR. If this happens the MSC/VLR continues the SMS activities but also sends the SGs Paging message for the non-SMS activity to the MME. The MME handles this SGs Paging message as if no SMS transfers are ongoing. Typically this leads to the MME invoking the handover/call redirection to GERAN/UTRAN features and it may lead to disruption of the SMS delivery. The MSC/VLR and mobile terminal 1 recovers from any such SMS disruption using the normal RP and CP layer retransmission timers/mechanisms.

Non-SMS Mobile Originating Activity During SMS Delivery

While one or more SMS messages is/are being transferred, other mobile originating requests (e.g. an mobile originating voice call or USSD) may be requested by the user. If this happens the MS/mobile terminal 1 continues the SMS activities but also sends the Extended Service Request message for the non-SMS activity to the MME. The MME handles this Extended Service Request message as if no SMS transfers are ongoing. Typically this leads to the MME invoking the handover/call redirection to GERAN/UTRAN features and it may lead to disruption of the SMS delivery. The MSC/VLR and mobile terminal 1 shall recover from any such SMS disruption using the normal RP and CP layer retransmission timers/mechanisms.

Mobile Terminating SMS when ISR is Active and SGS is Active Between MSC/VLR and MME When the MME receives the SGs Paging message for SMS, and ISR is active, and the mobile terminal 1 is in idle mode, the MME sends the S1 interface paging message to the E-UTRAN (using the S-TMSI as temporary identity) and sends a CS paging message (SMS indicator) to the SGSN using the MSC TMSI as temporary identity (unless the MSC did not allocate a TMSI, in which case the IMSI is used for paging).

The mobile terminal 1 is paged on E-UTRAN and by the SGSN on GERAN and/or UTRAN. For GERAN A/Gb mode, the SGSN sends a PAGING CS message to the BSS (see TS 48.018). For UTRAN, the SGSN sends a PAGING message to the UTRAN (see TS 25.413) with the CN Domain Indicator set to 'CS domain' and the Paging Cause set to 'Terminating Low Priority Signalling'. The mobile terminal 1 responds on the cell on which it is camped. When camped on E-UTRAN, the mobile terminal 1 responds to the MME. When camped on GERAN or UTRAN, the mobile terminal 1 responds to the MSC.

Co-Existence with SMS Over Generic 3GPP IP Access

If the home operator has deployed SMS over generic 3GPP IP access and/or SMS-Instant Messaging Interworking as defined in TS 23.204, and has configured the network and the mobile terminal 1 for using SMS over IP or SMS-Instant Messaging Interworking, then an SMS or IM will be delivered over EPS in any visited network whether or not the visited network supports SMS over generic 3GPP IP access.

If the home operator has not deployed SMS over generic 3GPP IP access and the mobile terminal 1 fails to successfully complete the combined EPS/IMSI attach procedure in the visited network (i.e. the visited network supports SMS over generic 3GPP IP access and does not support SGs for SMS capability), then the mobile terminal 1 cannot execute MT or MO SMS procedures in the visited network.

The CS fallback solution described above has advantages but requires the presence of 2G/3G network components, such as the MSC/VLR 2/14, which is an expensive and complex item. An MSC/VLR is a "stateful" component, and maintains an awareness of the location and authentication status of each mobile terminal registered therewith.

The embodiment of the system described herein provides a simple mechanism for delivering SMS messages without requiring the presence of 2G/3G network components, such as the MSC/VLR 2/14.

Figure 6:
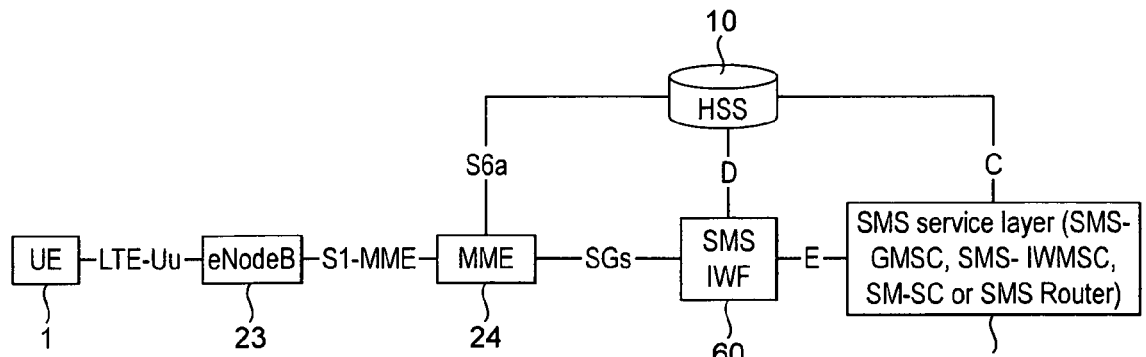
FIG. 6 shows a "Circuit Switched Fall Back" architecture in accordance with an embodiment of the system described herein.
Figure 7:
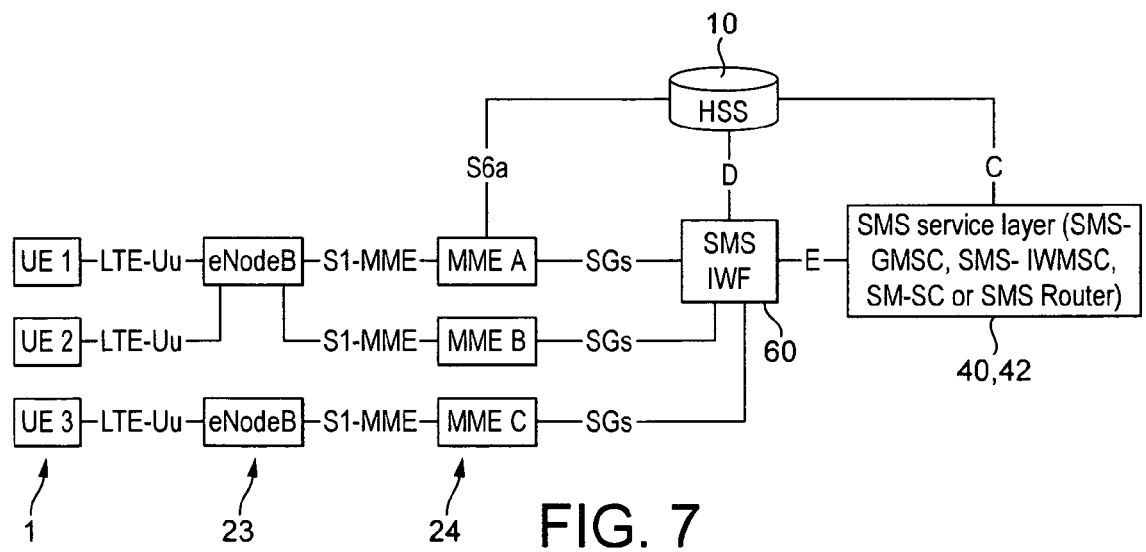
FIG. 7 shows a "Circuit Switched Fall Back" architecture for multiple mobile terminals, eNodeBs and MMEs in accordance with an embodiment of the system described herein.

The purpose of this embodiment is to avoid the need for a mobility management state machine (MSC 2) and/or VLR 14 in the node that terminates the SGs 28 interface away from the MME 24. According to the embodiment the MSC 2 is replaced with an SMS Interworking Function (SMS IWF) 60. In contrast to the MSC/VLR MSC/VLR 2/14, the SMS IWF 60 is a "stateless" component: it does not maintain an awareness of the location and authentication status of each mobile terminal registered therewith. The architecture proposed is shown in FIG. 6. FIG. 7 shows the architecture for multiple mobile terminals, eNodeBs and MMEs.

With one exception, no changes are proposed to the mobile terminal 1 (User Equipment) behaviour in relation to CS Fallback, i.e. there are common procedures for access technology selection, service identification (i.e. 'SMS only'), triggering of mobility management procedures, and signalling for SMS delivery.

However, existing deficiencies in the design of SMS over SGs do require some changes to the existing 3GPP TS 23.401 procedures. To overcome this deficiency the mobile terminal 1 needs to send its MSC Mobile Station Classmark 2 to the MME 24 at Attach and (non-periodic) TAU, in order that the MME 24 can pass this to the SMS IWF 60 so that the Classmark can be placed on the billing record generated by the SMS IWF 60.

The previously mentioned exception to mobile terminal 1 changes relates to an LTE mobile that does not support any 3GPP 2G or 3G technology. This mobile terminal 1 does not have a Mobile Station Classmark 2. However, such a mobile terminal 1 can generate one by setting the RF power capability to "111" (as used by a 3G mobile that does not support 2G) and setting other values to the "non-supported" setting and then sending this 'dummy' Classmark 2 to the MME 24.

Figure 3:
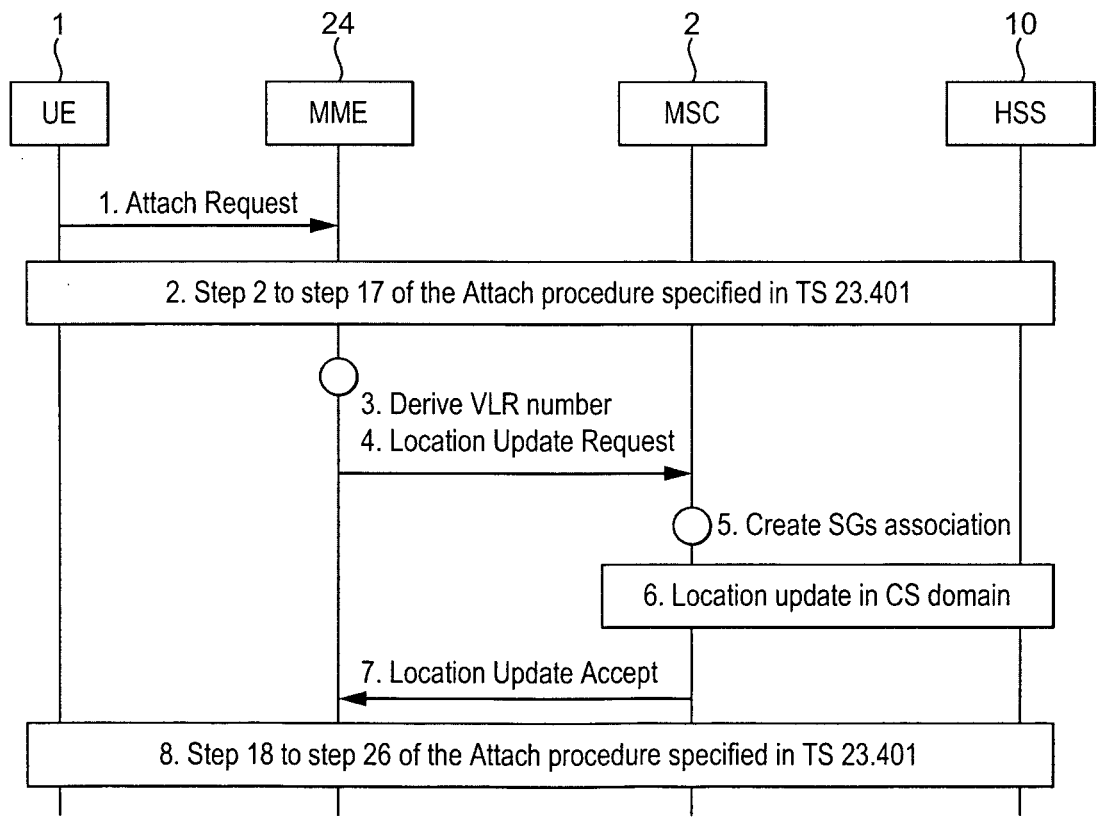
FIG. 3 shows the conventional attach procedure for the CS fallback.

FIG. 3, as discussed above, shows the standard CS Fall Back combined EPS/IMSI attach in order to obtain SMS only, as per current 3GPP TS 23.272

As mentioned above, in current approaches described in 3GPP TS 23.272, the MSC 2/VLR 14 is required, which is traditionally an expensive piece of telecommunications equipment. By utilising this embodiment, MSC 2/VLR 14 can be replaced with the SMS IWF 60 which is a much simpler device that does not require the storage of long term state information (e.g. it need not have a VLR 14 function).

In the Attach/TAU procedure, the main modification is on reception at the SMS IWF 60 of the Location Update Request in step 4.

Thus, the procedure is as follows:—

Figure 8:
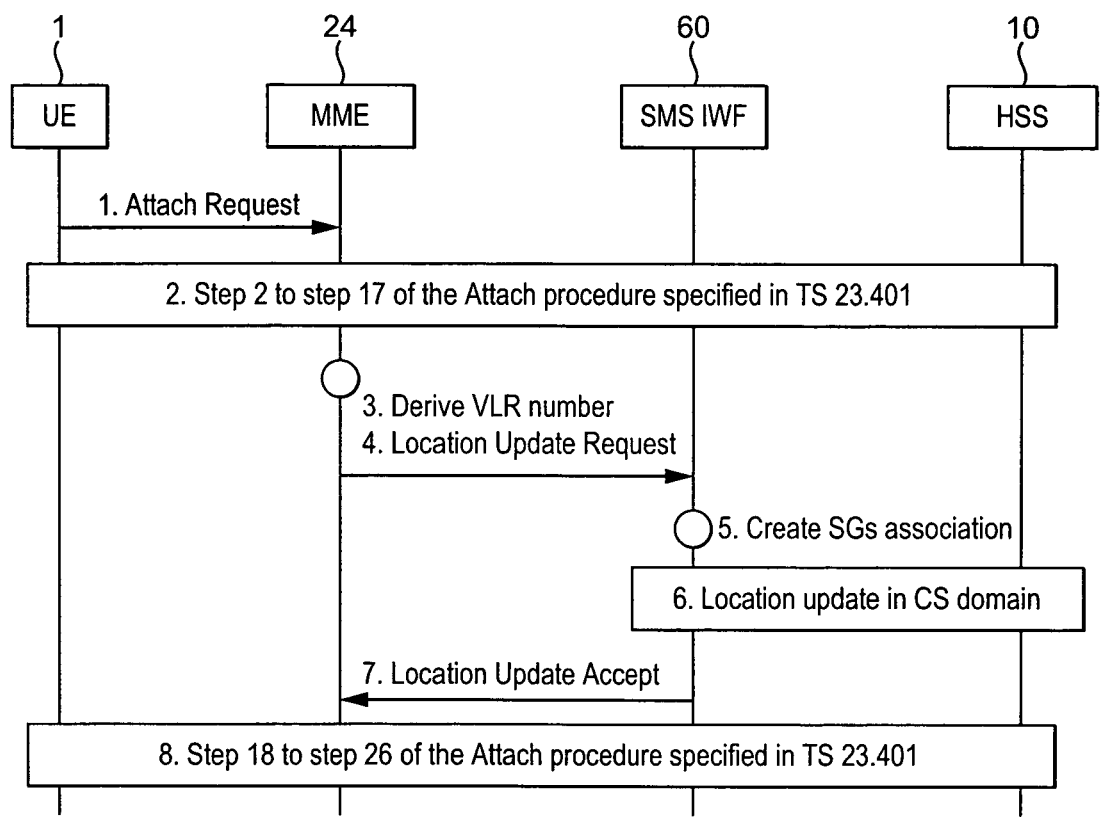
FIG. 8 shows the attach procedure for the CS fallback in accordance with an embodiment of the system described herein.

As explained above in relation to FIG. 3, the attach procedure for the CS fallback and SMS over SGs in EPS is realized based on the combined GPRS/IMSI Attach procedure specified in TS 23.060, which is fully incorporated herein by reference, and will now be described with reference to FIG. 8. The steps are as follows:—

1) The mobile terminal 1 initiates the attach procedure by the transmission of an Attach Request (with parameters as specified in TS 23.401 including the Attach Type and Mobile Station Classmark 2—or "dummy" classmark as discussed above if the mobile terminal 1 does not have a Mobile Station Classmark 2) message to the MME 24. The Attach Type indicates that the mobile terminal 1 requests a combined EPS/IMSI attach and informs the network that the mobile terminal 1 is capable and configured to use SMS over SGs 28. As the mobile terminal 1 needs SMS service but not full CS call fall back, the mobile terminal 1 includes an "SMS-only" indication in the combined EPS/IMSI Attach Request.

2) Step 3 to step 16 of the EPS Attach procedure are performed as specified in TS 23.401. The MME 24 receives subscriber data from the HSS 10 in step 2).

3) The MME 24 allocates a LAI for the mobile terminal 1, typically from a look up table which uses the eNodeB's Tracking Area Identity as the key.

4) The MME 24 sends a Location Update Request (new LAI, IMSI, MME name, Location Update Type) message to what it perceives to be the VLR but which is actually the SMS IWF 60. MME 24 name is a FQDN string.

At this point, the SMS IWF 60 maps each different MME Identity (e.g. IP address and/or MME name) to a different "MSC/VLR address" (i.e. SS7 Global Title address) from a pre-configured pool of SS7 GT addresses. The SMS IWF 60 itself hosts (from an SS7 routeing perspective) all of these different SS7 GT addresses. The mapping between the MME Identity and "MSC/VLR address" is 1-to-1. This 1-to-1 mapping can then be used later in MT SMS message handling. The SMS IWF 60 has a mapping between each MME connection to it with one SS7 GT address. An example of the stored mapping table, where each MME is identified by an IP address or MME name, is shown below in Table 1 below (Mapping table of MME name to SS7 GT stored in SMS IWF).

TABLE 1

Mapping table of MME name to SS7 GT stored in SMS IWF

| MME | MME name/IP address | Assigned SS7 GT |
|---|---|---|
| A | 192.168.1.4 | 447700900111 |
| B | aaa-1.internal.operator.com | 447700900112 |
| C | 10.34.78.67 | 447700900113 |

5) The SMS IWF 60 has created an association with each MME 24 by storing MME name/IP address.

6) The SMS IWF 60 performs Location Updating procedure in CS domain. The mapped "MSC/VLR address" is used by the SMS IWF 60 in the Location Update procedure to the HSS 10 in step 6, and the HSS 10 stores this mapped "MSC/VLR address" as the address of the "visited MSC/VLR".

As an example, using Table 1 and FIG. 7:

When UE 1 performs a combined Attach or combined Tracking Area Update procedure through MME A to the SMS IWF, the SMS IWF uses the SS7 Global Title 447700900111 in its signalling across the D interface to the HSS.

When UE 2 performs a combined Attach or combined Tracking Area Update procedure through MME B to the SMS IWF, the SMS IWF uses the SS7 Global Title 447700900112 in its signalling across the D interface to the HSS.

When UE 3 performs a combined Attach or combined Tracking Area Update procedure through MME C to the SMS IWF, the SMS IWF uses the SS7 Global Title 447700900113 in its signalling across the D interface to the HSS.

7) The SMS IWF 60 responds with Location Update Accept ("VLR" TMSI) to the MME.
8) The EPS Attach procedure is completed by performing step 17 to step 26 as specified in TS 23.401. Attach Accept message includes the parameters as specified in TS 23.401: "VLR" TMSI and LAI as allocated in step 3 above. The existence of LAI and "VLR" TMSI indicates successful attach to CS domain.
   The network performs the IMSI attach and the MME 24 indicates in the Attach Accept message that the IMSI attach is for "SMS-only".
   The mobile terminal 1 behaviour upon receiving such indications is described in TS 23.221.

After the attach procedure is completed, SMS messages can then be handled.

As the SMS IWF 60 does not provide any 'services' except MO SMS and MT SMS, the SMS IWF 60 need not store any subscription profile downloaded from the HSS 10, although MO SMS barring requires some special treatment.

This special treatment of MO SMS barring can be provided by either executing the barring functionality on the SMSC 40, or, in the SMS IWF and MME, as follows:
  To realise the MO SMS barring on the SMSC, one method is to mark the IMSI within the SMSC 40 as "pre-pay" and then install a zero (or sub-zero) balance on the credit platforms.
  To realise the MO SMS barring in the SMS IWF 60 and MME 24 while keeping the SMS IWF 60 stateless, the SMS IWF 60, upon receiving the Insert Subscriber Data message(s) for the subscriber (as defined in the TS 23.401 Attach Procedure), analyses the subscriber profile to see if the MO SMS barring indication is present. If, and only if, it is present then:
    The SMS IWF 60 includes a special "MO SMS barring" flag in the Location Update Accept message sent across the SGs interface to the MME 24—in step 7 above.
    The MME 24 uses this flag to store the mobile terminal's MO SMS barring status in the MME's database.
    Then later on, whenever the MME 24 sends an SGs Uplink Unitdata message on the SGs interface, the MME 24 encodes the mobile terminal's MO SMS barring status within the message.
    Upon receipt of the SGs Uplink Unitdata message, the SMS IWF 60 uses the encoded mobile terminal's MO SMS barring status to take the appropriate action, as per standard MSC behaviour, and thus rejects the MO SMS message, indicating the rejection back to the mobile terminal 1 via the MME 24.
  Alternatives to this MME behaviour are:
    the MME 24 only passes the MO Barring status in the SGs Uplink Unitdata messages that carry the RP-Data. However, this requires the MME 24 to be more aware of the SMS message delivery state machine; or
    the MME 24 uses the MO SMS barring information to locally reject the MO SMS without contacting the SMS-IWF 60. However, this requires the MME 24 to implement more of the SMS protocol set (e.g. to generate an RP-ERROR message with the correct RP Message Reference).

As per standard procedures, when using the SGs interface 28, the MSC/VLR 2/14 delegates security function handling to the MME 24. Hence the SMS IWF 60 does not download authentication vectors from the HSS 10, and, the SMS IWF 60 does not perform authentication of the mobile. Consequently, the SMS IWF 60 does not need to store sets of authentication vectors for each mobile.

SMS delivery across the SGs interface 28 does not require the mobile terminal 1 to switch (or "Fall Back") to the 2G/3G radio interfaces from LTE. For MT SMS the MME 24 pages the mobile with its EPS temporary identity (the S-TMSI). For both MO and MT SMS the mobile accesses the network using its S-TMSI in the Service Request procedure. Hence there is no need for the SMS IWF 60 to allocate an MSC TMSI (and hence no need to remember the linkage between IMSI and MSC TMSI.)

Because the SGs Location Update Request message sent by the MME 24 contains old and new LAIs, the SMS IWF 60 can copy the new LAI into the LAI sent in the SGs Location Update Accept message sent in step 7, and include the IMSI in the optional Mobile Identity field (inclusion of the IMSI ensures that any existing TMSI stored in the mobile terminal 1 is deleted). As described in the MT SMS section, below, the SMS IWF 60 does not need to store the LAI allocated to the mobile.

An alternative implementation is that the MIME 24 and/or SMS IWF 60 always use the same LAI for all 'combined attach' or 'SMS combined attach' mobile terminals. This LAI may, but need not, be broadcast on 2G or 3G cells.

At inter MME Tracking Area Update (i.e. the mobile terminal 1 changes its currently serving TAME 24), the SMS IWF 60 may or may not physically change, depending on network topology. However even if the same SMS IWF 60 is used, since the SMS IWF 60 is mobility management stateless (it has no VLR) it will perform a Location Update to the HSS 10. This automatically updates the "MSC/VLR address" (stored in the HSS 10) That actually identifies the currently serving MME 24.

Owing to the use of the existing "S1-flex" standardised feature, the number of inter-MME TAUs is expected to be low, hence no significant extra HSS signalling load is generated. The S1-flex concept provides support for network redundancy and load sharing of traffic across network elements in the core network, the MME 24 and the SGW, by creating pools of MMEs and SGWs and allowing each eNB to be connected to multiple MMEs and SGWs in a pool.

Intra-MME Tracking Area Updates are not signalled across the SGs interface 28.

For offline charging purposes, the SMS IWF 60 generates CDRs according to the appropriate 3GPP Specifications (e.g. 3GPP TS 32.250).

Online charging is not implemented on the SMS IWF 60. Instead online charging is implemented on the SMSC 42. This aligns with current GSM/UNITS operator practice for the charging of SMS messages by the Home PLMN when mobile terminals are roaming.

MO SMS

The mobile terminal 1 uses standard 3GPP TS 23.272/23.040/24.301/24.011 procedures for initiating a SMS message. When the MME 24 sends an SGsAP UPLINK UNITDATA message (that carries the Up-Link SMS message) the MME adds the mobile terminal's MSISDN to the information sent to the SMS IWF 60 (the MSISDN is downloaded to the MME 24 from the HSS 10 at Attach (or first TAU in that MME 24), and stored in the MME's database). When the SMS IWF 60 receives the SGsAP UPLINK UNITDATA, it extracts the MSISDN field to populate the RP OA (originating address field) before sending the SMS message onwards towards the SMSC 42 using standard Mobile Application Part (MAP) messaging as specified in 3GPP TS 23.040/29.002. The SMSC 42 is selected by the normal procedures (e.g. it is the SMSC 42 indicated by the mobile terminal 1 within the RP-Destination Address IE in the RP-DATA message).

For consistency and for keeping the MME 24 unaware of the contents of the message being transported, the MME 24 includes the MSISDN into all SGsAP UPLINK UNITDATA messages. However, an alternative implementation is that the MME 24 only adds the MSISDN information to the SGsAP UPLINK UNITDATA messages that carry the RP-DATA message and/or only those messages related to MO SMS (and not those for MT SMS).

The MME 24 is also modified so that it adds the mobile terminal's current E-UTRAN Global Cell ID, current TAI, mobile terminal's Circuit Switched "classmark" and mobile terminal's IMEISV into all SGsAP UPLINK UNITDATA messages. This is needed so that the SMS IWF 60 can correctly generate the standard MSC billing records according to 3GPP TS 32.250. (In order to use a legacy MSC billing record format, the TAC is placed into the LAC field on the CDR, and, for example, the 16 least significant bits of the E-CGI are placed into the Cell Identity field on the CDR. As the TAC and LAC are normally distinct within a PLMN, ambiguity on 'cell of origin' is very rare.)

Thus, the conventional procedure may be amended as follows:—

Mobile Originating SMS in Idle Mode

Figure 9:
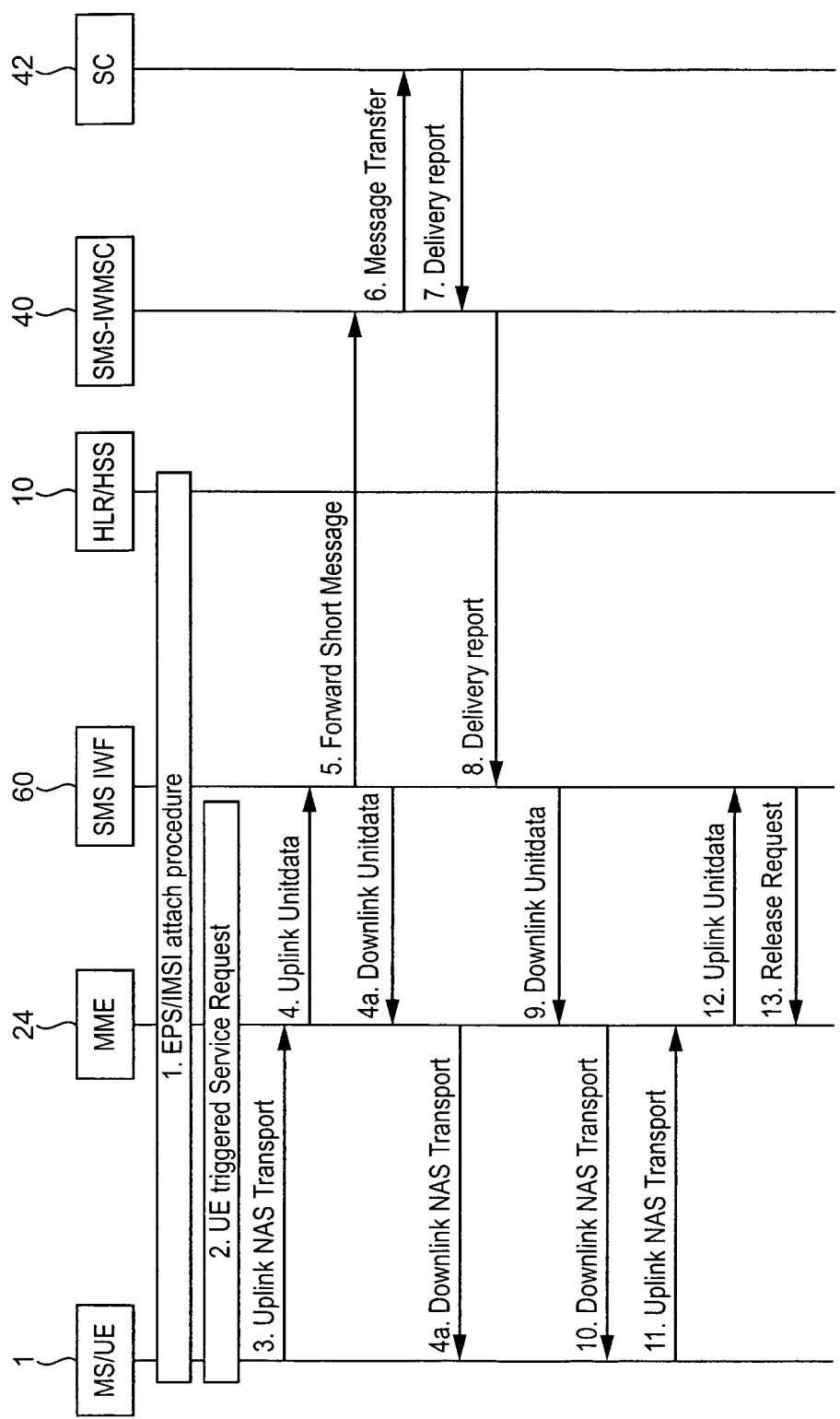
FIG. 9 shows the procedure for Mobile Originating SMS in idle mode in accordance with an embodiment of the system described herein.

The following sequence flow in FIG. 9 shows the delivery of mobile originating SMS in idle mode.

1. The combined EPS/IMSI attach procedure as described with reference to FIG. 8 is performed.

2. A mobile originating SMS is triggered and the MS/mobile terminal 1 is in idle mode. The MS/mobile terminal 1 initiates the mobile terminal 1 triggered Service Request procedure, which is defined in TS 23.401. The mobile terminal 1 indicates its S-TMSI in the RRC signalling. The S-TMSI is similar in format to the P-TMSI. It is used to protect the subscribers IMSI during NAS interaction as well as identifying the MME (Mobility Management Entity) or MME pool that is responsible for the mobile terminal 1. The S-TMSI is constructed from the MMEC (MME Code) and the M-TMSI (MME TMSI).

3. The MS/mobile terminal 1 builds the SMS message to be sent as defined in TS 23.040 (i.e. the SMS message consists of CP-DATA/RP-DATA/TPDU/SMS-SUBMIT parts). Following the activation of the Radio Bearers, the SMS message is encapsulated in an NAS message and sent to the MME 24.

4. The MIME 24 forwards the SMS message to the SMS IWF 60 in an Uplink Unitdata message. As mentioned above, the MME 24 adds the mobile terminal's MSISDN to the information sent to the SMS IWF 60, and adds the mobile terminal's current E-UTRAN Global Cell ID, current TAI, mobile terminal's Circuit Switched "classmark" and mobile terminal's IMEISV into all SGsAP UPLINK UNITDATA messages.

4a. The SMS IWF 60 acknowledges receipt of the SMS to the mobile terminal 1.

5.-8. These steps are performed as defined in TS 23.040. As mentioned above, when the SMS IWF 60 receives the SGsAP UPLINK UNITDATA, it extracts the MSISDN field to populate the RP OA (originating address field) before sending the SMS message onwards towards the SMS-IWMSC 40 and then to the SMSC 42 using standard Mobile Application Part (MAP) messaging as specified in 3GPP TS 23.040/29.002. The SMSC 42 is selected by the normal procedures (e.g. it is the SMSC 42 indicated by the mobile terminal 1 within the RP-Destination Address IE in the RP-DATA message). The SC returns a delivery report message.

9. The SMS IWF 60 forwards the received delivery report to the MME 24 associated with the MS/mobile terminal 1 in a Downlink Unitdata message.

10. The MME 24 encapsulates the received delivery report in an NAS message and sends the message to the MS/mobile terminal 1.

11, 12. The mobile terminal 1 acknowledges receipt of the delivery report to the SMS IWF 60.

13. The SMS IWF 60 indicates to the MME 24 that no more NAS messages need to be tunnelled.

Mobile Originating SMS in Active Mode

The Mobile Originating SMS in active Mode procedure reuses the Mobile Originating SMS in Idle Mode with the following modification:

The established signalling connection between the MS/mobile terminal 1 and the MME 24 is reused for the transport of the SMS message and the delivery report (i.e. the mobile terminal 1 triggered Service Request procedure defined in step 2 is skipped).

MT SMS

MT SMS is performed according to existing procedures in 3GPP TS 23.040, with the following modifications.

In the Send Routing Information (SRI) for SM messaging initiated from an SMS Router or SMSC 42, the HSS 10 returns the IMSI and the "MSC/VLR address" of the node last recorded as performing the Location Update procedure, as per current SMS procedures. In this scenario, as discussed above, the "MSC/VLR address" identifies the SMS IWF 60 (but with an SS7 GT address that permits the SMS IWF 60 to identify the mobile terminal's MME 24). The SMSC 42/SMS Router then forwards the SMS message to the SS7 GT address returned by the HSS 10, and includes the IMSI as obtained in the SRI for SM. The SMS IWF 60 looks-up the received SS7 GT address used to forward the SMS message to it against the internal mapping table built during the initial attach (see discussion above in relation to example in Table 1) to identify the mobile terminal's currently serving MME 24. SGs paging is then initiated to the mobile terminal's current MME 24.

Although a conventional MSC/VLR stores the mobile terminal's current LAI, this is not necessary in the SMS IWF 60. When the SMS IWF 60 does not store the current Location Area Identifier, the SGs paging message is sent to the MME 24 with a "special" LAI. Normally the "mobile terminal 1 is known in the MME" and the MME 24 ignores the LAI information. However, if an MME 24 reset has occurred, the MME 24 uses the received LAI to determine in which Tracking Areas to page the mobile terminal 1. When the "special LAI" is received, the MME 24 (which has reset) uses configuration data in the MME 24 to determine in which TAIs to page the mobile terminal 1 (this could be new "SMS IWF specific" configuration data, or, a default of "all TAIs served by the MME"). To avoid long term mobile terminal 1 specific storage in the SMS IWF 60, the "special LAI" need not be mobile terminal 1 specific.

SGs interface Paging remains controlled by the SMS IWF 60 but this passes the IMSI as the identifier to the MME. The remainder of the procedure is as per 3GPP TS 23.272 (i.e. the MIME uses the Service Indicator set to "SMS indicator" in the SGs paging message to trigger paging with the S-TMSI and PS domain indicator).

When the mobile terminal 1 responds to paging, the Service Request message is sent on the SGs interface 28. The MIME 24 is modified to add MSISDN, current E-UTRAN Global Cell ID, current TAI, mobile terminal's Circuit Switched "classmark" and mobile terminal's IMEISV into the Service Request message. This is needed so that the SMS IWF 60 can generate the standard MSC billing records according to 3GPP TS 32.250. (In order to use a legacy MSC billing record format, the TAC is placed into the LAC field on the CDR, and, for example, the 16 least significant bits of the E-CGI are placed into the Cell Identity field on the CDR. As the TAC and LAC are normally distinct within a PLMN, ambiguity on 'cell of origin' is rare.)

An alternative is that the MSISDN, E-CGI, TAI, Classmark and IMEISV are placed in the SGs interface UPLINK UNIT-DATA messages. However, this is not the preferred approach because existing MSC/VLRs are likely to open their CDRs when the A/Iu interface CM Service Request message (equivalent to the SGs Service Request message) is received, not when the CP-Ack message is received.

As per existing 3GPP TS 29.118 procedures, after the Service Request message is received by the SMS IWF 60, the SMS message is sent across the SGs interface 28 in a DOWN-LINK UNITDATA message.

Thus, the conventional procedure may be amended as follows:—

Mobile Terminating SMS in Idle Mode

Figure 10:
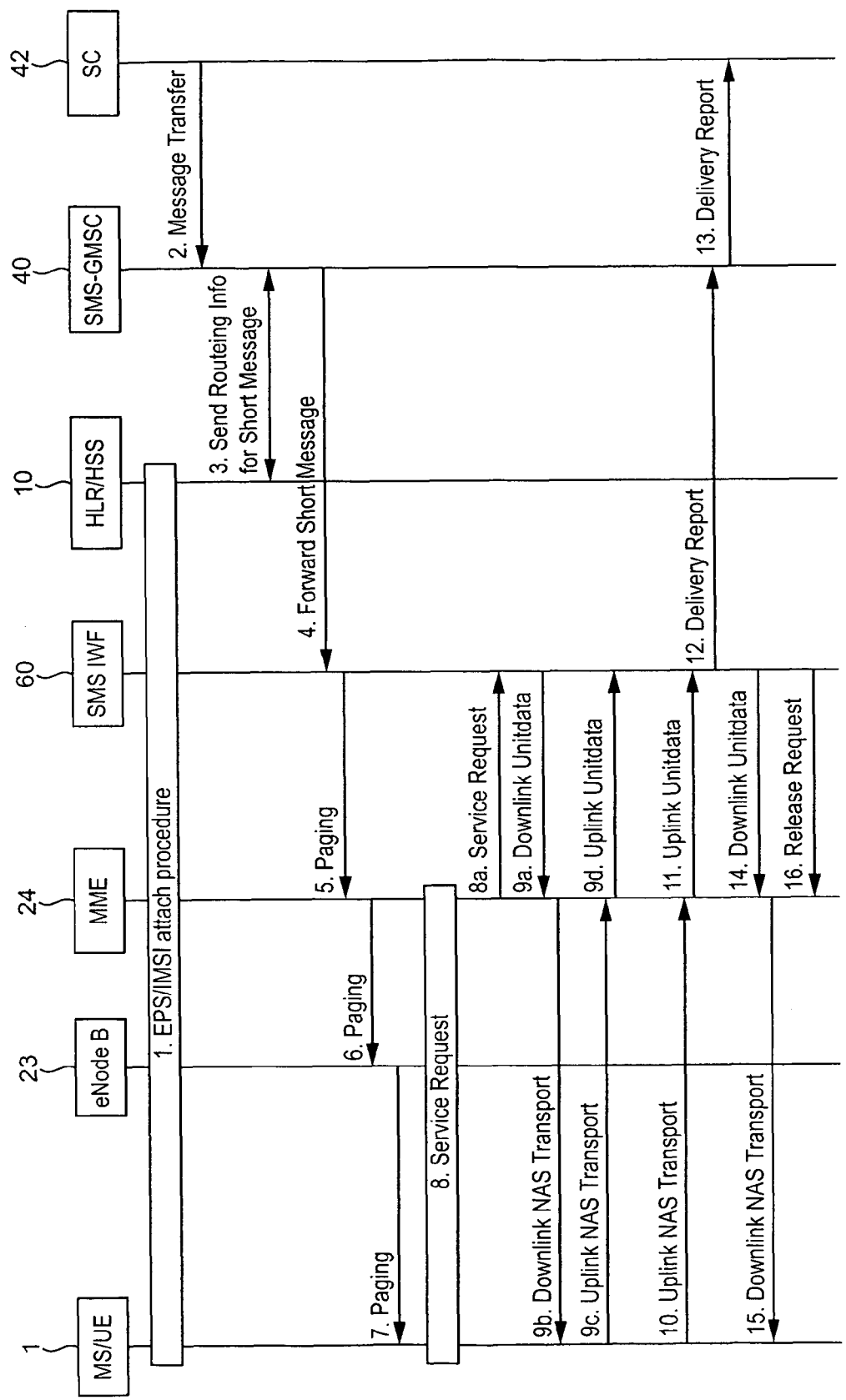
FIG. 10 shows the procedure for Mobile Terminating SMS in idle mode in accordance with an embodiment of the system described herein.

The following sequence flow in FIG. 10 shows the delivery of mobile terminating SMS in idle mode.

1. The combined EPS/IMSI attach procedure as described with reference to FIG. 3 is performed.

2-4. The SC 42 initiates transfer of mobile terminating SMS. The HLR 10 is requested for routing number for SMS services. The SMS IWF 60 and MME 24 are identified as described above. The SMS message is forwarded to the SMS IWF 60.

5. The SMS IWF 60 sends a Paging (IMSI, VLR TMSI, "special" LAI, SMS indicator) message to the MME 24.

6. The MME 24 initiates the paging procedure by sending the Paging (as specified in TS 23.401) message to each eNodeB 23 with cells belonging to the tracking area(s) in which the mobile terminal 1 is registered. The mobile terminal 1 is paged with its S-TMSI.

7. The MS/mobile terminal 1 is paged by the eNodeBs 23.

8. The mobile terminal 1 sends a Service Request message to the MME 24. The mobile terminal 1 indicates its S-TMSI in the RRC signalling. The MATE 24 sends the S1-AP Initial Context Setup Request message to the eNodeB 23 and the eNodeB 23 establishes the Radio Bearers.

8a. The MME 24 sends a Service Request message to the SMS IWF 60. In order to permit the SMS IWF 60 to create an accurate charging record, as mentioned above, the MME 24 adds the MSISDN, current E-UTRAN Global Cell ID, current TAI, mobile terminal's Circuit Switched "classmark" and mobile terminal's IMEISV into the Service Request message, as well as the local time zone.

9a. The SMS IWF 60 builds the SMS message to be sent as defined in TS 23.040 (i.e. the SMS message consists of CP-DATA/RP-DATA/TPDU/SMS-DELIVER parts). The SMS IWF 60 forwards the SMS message to the MME 24 in a Downlink Unitdata message.

9b. The MME 24 encapsulates the SMS message in a NAS message and sends the message to the MS/mobile terminal 1

9c, 9d. The MS/mobile terminal 1 acknowledges receipt of the SMS message to the SMS IWF 60.

10. The MS/mobile terminal 1 returns a delivery report as defined in TS 23.040. The delivery report is encapsulated in an NAS message and sent to the MME 24.

11. The MME 24 forwards the delivery report to the SMS IWF 60 in an Uplink Unitdata message.

12-13. These steps are performed as defined in TS 23.040. The delivery report is forwarded to the SC 42.

14-15. In parallel to steps 12-13, the SMS IWF 60 acknowledges receipt of the delivery report to the MS/mobile terminal 1.

16. The SMS IWF 60 indicates to the MME 24 that no more NAS messages need to be tunnelled.

Mobile Terminating SMS in Active Mode

Mobile terminating SMS in Active Mode procedure reuses the Mobile Terminating SMS in Idle Mode with the following modification:

There is no need for the MME 24 to perform Paging of the MS/mobile terminal 1 after step 5. MIME 24 continues with step 8a (i.e. steps 6 to 8 are skipped). The MME 24 immediately sends a Downlink Unitdata to the mobile terminal 1.

Message Waiting

In the known functionality specified in 3GPP TS 23.040, when an MSC/VLR fails to successfully deliver an MT SMS message, it is required to set its "SMS message waiting flag" (MNRF), and, when the mobile terminal 1 next makes radio contact with that MSC, the MSC informs the HSS that the mobile is now available.

According to the embodiment, with the 'stateless' SMS IWF 60 (or a full MSC/VLR), MO SMS delivery failure causes the SMS IWF 60 to send the Non-EPS Alert request message to the MME 24. The MME 24 then sets its Non-EPS Alert Flag (NEAF). When the mobile terminal 1 next makes radio contact with the E-UTRAN, the MME 24 will be involved and then the "set" NEAF causes the MME 24 to inform the SMS IWF that the mobile terminal 1 has returned. The SMS IWF 60 uses the IMSI in the SGs message to derive the HSS identity and then sends the Ready_For_SM MAP message for this IMSI to the derived HSS 10.

An alternative is that the MME 24 sets the NEAF locally on determining a paging failure for SMS over SGs 28. However, this is not the preferred approach because existing MSC/VLR designs should automatically send the Non-EPS Alert request message to the MME 24 upon MT SMS delivery failure.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of routing legacy messages between a message centre and a mobile telecommunications device registered with a mobile telecommunications network, the mobile telecommunications network including a plurality of base stations each serving a plurality of mobile telecommunications devices, and a plurality of mobility management entities, each serving a plurality of said base stations, the mobility management entities being adapted to communicate using a legacy protocol with a legacy network for routing the legacy messages between the message centre and the mobile telecommunications device via the legacy network, the method comprising:
providing a legacy message interworking function, wherein the legacy message interworking function is a stateless component that does not maintain a location or authentication status of each mobile telecommunications device registered with the mobile telecommunications network, wherein the legacy message interworking function performs the following:
receives a legacy message from at least one of the mobility management entities using the legacy protocol; and
directly routes the legacy message to the message centre without routing the legacy message via a mobile services switching centre of the legacy network.

2. The method of claim 1, wherein the legacy message is an SMS message.

3. The method of claim 1, wherein the legacy protocol is an SGs Interface protocol.

4. The method of claim 1, wherein the legacy message interworking function communicates with a register of the legacy network to obtain routing information for the legacy message.

5. The method of claim 1, wherein the legacy message interworking function has a plurality of addresses, each of which corresponds to one of said mobility management entities, wherein the plurality of addresses are used for routing messages between the mobility management entities and the message centre.

6. The method of claim 1, wherein the legacy message is a first legacy message, the method further comprising:
selectively barring the transmission of a second legacy message.

7. The method of claim 1, wherein the mobile telecommunications network operates only in the packet switched domain and the legacy message is transmitted in the legacy network in the circuit switched domain.

8. A mobile telecommunications network, comprising:
a plurality of mobile telecommunications devices registered with the mobile telecommunications network;
a plurality of base stations, each serving a plurality of the mobile telecommunications devices;
a plurality of mobility management entities, each serving a plurality of the base stations, the mobility management entities being adapted to communicate using a legacy protocol with a legacy network for routing legacy messages between a message centre and the mobile telecommunications devices via the legacy network; and
a legacy message interworking function, wherein the legacy message interworking function is a stateless component that does not maintain a location or authentication status of each mobile telecommunications device registered with the mobile telecommunications network, wherein the legacy message interworking function performs the following:
receives a legacy message from at least one of the mobility management entities using the legacy protocol; and
directly routes the legacy message to the message centre without routing the legacy message via a mobile services switching centre of the legacy network.

9. The network of claim 8, wherein the legacy message is an SMS message.

10. The network of claim 8, wherein the legacy protocol is an SGs Interface protocol.

11. The network of claim 8, wherein the legacy message interworking function is operable to communicate with a register of the legacy network to obtain routing information for the legacy message.

12. The network of claims 8, wherein the legacy message interworking function has a plurality of addresses, each of which corresponds to one of said mobility management entities, wherein the plurality of addresses are used for routing messages between the mobility management entities and the message centre.

13. The network of claim 8, wherein the legacy message is a first legacy message, the network further comprising:
a device that selectively bars the transmission of a second legacy message.

14. The network of claim 8, wherein the mobile telecommunications network operates only in the packet switched domain and the legacy message is transmitted in the legacy network in the circuit switched domain.

15. A non-transitory computer readable medium storing computer software for routing legacy messages between a message centre and a mobile telecommunications device registered with a mobile telecommunications network, the mobile telecommunications network including a plurality of base stations each serving a plurality of mobile telecommunications devices, and a plurality of mobility management entities, each serving a plurality of said base stations, the mobility management entities being adapted to communicate using a legacy protocol with a legacy network for routing the legacy messages between the message centre and the mobile telecommunications device via the legacy network, the computer software comprising:
executable code that provides a legacy message interworking function, wherein the legacy message interworking function is a stateless component that does not maintain a location or authentication status of each mobile telecommunications device registered with the mobile telecommunications network, wherein the executable code that provides the legacy message interworking function further includes:
executable code that receives a legacy message from at least one of the mobility management entities using the legacy protocol; and
executable code that directly routes the legacy message to the message centre without routing the legacy message via a mobile switching center of the legacy network.

16. The non-transitory computer readable medium of claim 15, wherein the legacy message is an SMS message, and wherein the legacy protocol is an SGs Interface protocol.

17. The non-transitory computer readable medium of claim 15, wherein the legacy message interworking function communicates with a register of the legacy network to obtain routing information for the legacy message.

18. The non-transitory computer readable medium of claim 15, wherein the legacy message interworking function has a plurality of addresses, each of which corresponds to one of said mobility management entities, wherein the plurality of addresses are used for routing messages between the mobility management entities and the message centre.

19. The non-transitory computer readable medium of claim 15, wherein the legacy message is a first legacy message, the computer software further comprising:
   executable code that selectively bars the transmission of a second legacy message.

20. The non-transitory computer readable medium of claim 15, wherein the mobile telecommunications network operates only in the packet switched domain and the legacy message is transmitted in the legacy network in the circuit switched domain.

* * * * *